United States Patent
Kumarasamy et al.

(10) Patent No.: US 9,659,076 B2
(45) Date of Patent: *May 23, 2017

(54) SYSTEMS AND METHODS FOR DATABASE ARCHIVING

(71) Applicant: Commvault Systems, Inc, Tinton Falls, NJ (US)

(72) Inventors: Paramasivam Kumarasamy, Morganville, NJ (US); Brahmaiah Vallabhaneni, Marlboro, NJ (US)

(73) Assignee: COMMVAULT SYSTEMS, INC., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/001,057

(22) Filed: Jan. 19, 2016

(65) Prior Publication Data

US 2016/0239555 A1 Aug. 18, 2016

Related U.S. Application Data

(63) Continuation of application No. 13/786,928, filed on Mar. 6, 2013, now Pat. No. 9,275,086.

(Continued)

(51) Int. Cl.
*G06F 17/30* (2006.01)
*G06F 11/14* (2006.01)
*G06F 11/20* (2006.01)

(52) U.S. Cl.
CPC ...... *G06F 17/30575* (2013.01); *G06F 17/303* (2013.01); *G06F 17/30309* (2013.01);
(Continued)

(58) Field of Classification Search
CPC ........... G06F 17/30309; G06F 11/2094; G06F 11/1456; G06F 17/303; G06F 17/30575; G06F 17/30371
See application file for complete search history.

(56) References Cited

U.S. PATENT DOCUMENTS

| 4,084,231 A | 4/1978 | Capozzi et al. |
| 4,267,568 A | 5/1981 | Dechant et al. |

(Continued)

FOREIGN PATENT DOCUMENTS

| EP | 0259912 | 3/1988 |
| EP | 0405926 | 1/1991 |

(Continued)

OTHER PUBLICATIONS

"What is a Sharepoint List?" by Chris. Publication date unknown. Accessed archive from Sep. 27, 2012 on Jul. 30, 2015. <https://web.archive.org/web/201209270 12118/http://www.fastsharepoint.com/tutorials/SharePoi ntList>.

(Continued)

*Primary Examiner* — Shiow-Jy Fan
(74) *Attorney, Agent, or Firm* — Knobbe, Martens, Olson & Bear LLP

(57) ABSTRACT

A data storage system according to certain aspects can archive database data associated with different database applications. The data storage system according to certain aspects may provide database archiving modules that include logic incorporating and/or based on the native schema and/or native commands specific to particular database applications. The database archiving modules according to certain aspects may determine the relationship between tables associated with corresponding database applications and archive selected database data based on the native schema and native commands.

20 Claims, 9 Drawing Sheets

Related U.S. Application Data

(60) Provisional application No. 61/674,207, filed on Jul. 20, 2012.

(52) U.S. Cl.
CPC .... *G06F 17/30371* (2013.01); *G06F 11/1456* (2013.01); *G06F 11/2094* (2013.01)

(56) References Cited

U.S. PATENT DOCUMENTS

| | | | |
|---|---|---|---|
| 4,283,787 A | 8/1981 | Chambers | |
| 4,417,321 A | 11/1983 | Chang et al. | |
| 4,641,274 A | 2/1987 | Swank | |
| 4,654,819 A | 3/1987 | Stiffler et al. | |
| 4,686,620 A | 8/1987 | Ng | |
| 4,912,637 A | 3/1990 | Sheedy et al. | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,301,286 A | 4/1994 | Rajani | |
| 5,321,816 A | 6/1994 | Rogan et al. | |
| 5,347,653 A | 9/1994 | Flynn et al. | |
| 5,410,700 A | 4/1995 | Fecteau et al. | |
| 5,420,996 A | 5/1995 | Aoyagi | |
| 5,454,099 A | 9/1995 | Myers et al. | |
| 5,559,991 A | 9/1996 | Kanfi | |
| 5,642,496 A | 6/1997 | Kanfi | |
| 5,758,337 A | 5/1998 | Hammond | |
| 5,991,772 A | 11/1999 | Doherty et al. | |
| 6,151,608 A | 11/2000 | Abrams | |
| 6,199,074 B1 | 3/2001 | Kern et al. | |
| 6,374,267 B1 | 4/2002 | Tam | |
| 6,418,478 B1 | 7/2002 | Ignatius et al. | |
| 6,460,043 B1 | 10/2002 | Tabbara et al. | |
| 6,542,972 B2 | 4/2003 | Ignatius et al. | |
| 6,658,436 B2 | 12/2003 | Oshinsky et al. | |
| 6,721,767 B2 | 4/2004 | De Meno et al. | |
| 6,760,723 B2 | 7/2004 | Oshinsky et al. | |
| 7,003,641 B2 | 2/2006 | Prahlad et al. | |
| 7,035,880 B1 | 4/2006 | Crescenti et al. | |
| 7,113,964 B1 | 9/2006 | Bequet et al. | |
| 7,130,970 B2 | 10/2006 | Devassy et al. | |
| 7,162,496 B2 | 1/2007 | Amarendran et al. | |
| 7,174,433 B2 | 2/2007 | Kottomtharayil et al. | |
| 7,246,207 B2 | 7/2007 | Kottomtharayil et al. | |
| 7,315,923 B2 | 1/2008 | Retnamma et al. | |
| 7,343,453 B2 | 3/2008 | Prahlad et al. | |
| 7,389,311 B1 | 6/2008 | Crescenti et al. | |
| 7,395,282 B1 | 7/2008 | Crescenti et al. | |
| 7,440,982 B2 | 10/2008 | Lu et al. | |
| 7,454,569 B2 | 11/2008 | Kavuri et al. | |
| 7,490,207 B2 | 2/2009 | Amarendran et al. | |
| 7,500,053 B1 | 3/2009 | Kavuri et al. | |
| 7,519,620 B2 | 4/2009 | Yokouchi | |
| 7,529,782 B2 | 5/2009 | Prahlad et al. | |
| 7,536,291 B1 | 5/2009 | Vijayan Retnamma et al. | |
| 7,539,707 B2 | 5/2009 | Prahlad et al. | |
| 7,543,125 B2 | 6/2009 | Gokhale | |
| 7,546,324 B2 | 6/2009 | Prahlad et al. | |
| 7,603,386 B2 | 10/2009 | Amarendran et al. | |
| 7,606,844 B2 | 10/2009 | Kottomtharayil | |
| 7,613,752 B2 | 11/2009 | Prahlad et al. | |
| 7,617,253 B2 | 11/2009 | Prahlad et al. | |
| 7,617,262 B2 | 11/2009 | Prahlad et al. | |
| 7,620,710 B2 | 11/2009 | Kottomtharayil et al. | |
| 7,634,511 B1 | 12/2009 | Freiheit et al. | |
| 7,636,743 B2 | 12/2009 | Erofeev | |
| 7,651,593 B2 | 1/2010 | Prahlad et al. | |
| 7,657,550 B2 | 2/2010 | Prahlad et al. | |
| 7,660,807 B2 | 2/2010 | Prahlad et al. | |
| 7,661,028 B2 | 2/2010 | Erofeev | |
| 7,747,579 B2 | 6/2010 | Prahlad et al. | |
| 7,778,974 B2 | 8/2010 | Compton et al. | |
| 7,801,864 B2 | 9/2010 | Prahlad et al. | |
| 7,809,914 B2 | 10/2010 | Kottomtharayil et al. | |
| 7,836,022 B2 | 11/2010 | Gillespie | |
| 7,840,539 B2 | 11/2010 | Mooney et al. | |
| 8,065,278 B2 | 11/2011 | Beatty et al. | |
| 8,131,964 B2 | 3/2012 | Retnamma et al. | |
| 8,170,995 B2 | 5/2012 | Prahlad et al. | |
| 8,229,954 B2 | 7/2012 | Kottomtharayil et al. | |
| 8,244,681 B2 | 8/2012 | Laffin | |
| 8,271,436 B2 | 9/2012 | D'Souza et al. | |
| 8,285,681 B2 | 10/2012 | Prahlad et al. | |
| 8,307,177 B2 | 11/2012 | Prahlad et al. | |
| 8,315,981 B2 | 11/2012 | Prahlad | |
| 8,364,652 B2 | 1/2013 | Vijayan et al. | |
| 8,370,542 B2 | 2/2013 | Lu et al. | |
| 8,442,945 B1 | 5/2013 | Doerner | |
| 8,543,542 B2 | 9/2013 | D'Souza et al. | |
| 8,578,120 B2 | 11/2013 | Attarde et al. | |
| 8,606,752 B1 | 12/2013 | Beatty et al. | |
| 8,745,003 B1 | 6/2014 | Patterson | |
| 8,874,519 B1 | 10/2014 | Payne | |
| 8,935,492 B2 | 1/2015 | Gokhale et al. | |
| 9,276,188 B2 | 3/2016 | Kumarasamy et al. | |
| 9,298,715 B2 | 3/2016 | Kumarasamy et al. | |
| 2004/0059738 A1 | 3/2004 | Tarbell | |
| 2005/0203887 A1 | 9/2005 | Joshi et al. | |
| 2006/0015485 A1 | 1/2006 | Hofmann | |
| 2006/0095481 A1 | 5/2006 | Singh et al. | |
| 2006/0224846 A1 | 10/2006 | Amarendran et al. | |
| 2007/0050777 A1* | 3/2007 | Hutchinson | G06F 11/0709 |
| | | | 718/104 |
| 2007/0083563 A1 | 4/2007 | Souder et al. | |
| 2007/0143371 A1 | 6/2007 | Kottomtharayil | |
| 2007/0288490 A1 | 12/2007 | Longshaw | |
| 2008/0034018 A1* | 2/2008 | Cisler | G06F 3/04847 |
| 2008/0144601 A1 | 6/2008 | Nurminen et al. | |
| 2008/0172391 A1* | 7/2008 | Adelman | G06Q 10/10 |
| 2009/0319534 A1 | 12/2009 | Gokhale | |
| 2010/0082553 A1 | 4/2010 | Beatty et al. | |
| 2010/0082554 A1 | 4/2010 | Beatty et al. | |
| 2010/0082672 A1 | 4/2010 | Kottomtharayil et al. | |
| 2010/0191702 A1 | 7/2010 | Hofmann | |
| 2010/0250549 A1* | 9/2010 | Muller | G06F 17/30575 |
| | | | 707/741 |
| 2011/0010440 A1 | 1/2011 | Kottomtharayil et al. | |
| 2011/0125714 A1 | 5/2011 | Manson | |
| 2012/0150818 A1 | 6/2012 | Vijayan Retnamma et al. | |
| 2012/0150826 A1 | 6/2012 | Vijayan Retnamma et al. | |
| 2013/0198165 A1* | 8/2013 | Cheng | G06F 17/30289 |
| | | | 707/714 |
| 2013/0238562 A1 | 9/2013 | Kumarasamy et al. | |
| 2014/0201159 A1 | 7/2014 | Kumarasamy et al. | |
| 2014/0201160 A1 | 7/2014 | Kumarasamy et al. | |
| 2014/0201161 A1 | 7/2014 | Kumarasamy et al. | |
| 2014/0317063 A1 | 10/2014 | Patterson | |
| 2016/0210064 A1 | 7/2016 | Dornemann et al. | |
| 2016/0210194 A1 | 7/2016 | Kumarasamy et al. | |
| 2016/0210203 A1 | 7/2016 | Kumarasamy et al. | |
| 2016/0210306 A1 | 7/2016 | Kumarasamy et al. | |
| 2016/0210342 A1 | 7/2016 | Kumarasamy et al. | |
| 2016/0314046 A1 | 10/2016 | Kumarasamy et al. | |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |

(56) References Cited

FOREIGN PATENT DOCUMENTS

| WO | WO 95/13580 | 5/1995 |
|---|---|---|
| WO | WO 99/12098 | 3/1999 |
| WO | WO 2006/052872 | 5/2006 |

OTHER PUBLICATIONS

Arneson, "Mass Storage Archiving in Network Environments" IEEE, Oct. 31-Nov. 1998, pp. 45-50.
Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Commvault, "Commvault Simpana Intellisnap Snapshot Management Technology: Capabilities and Benefits", 16 pages, 2014.
Commvault, "Commvault Snapshot Backup & Recovery", 9 pages, 2015.
Commvault Systems, Inc., "Simpana Intellisnap Technology, Make Snaps Work", 2 pages, 2014.
Commvault Systems, Inc., "Synthetic Full Backups" ), 3 pages, 1997-2015.
Eitel, "Backup and Storage Management in Distributed Heterogeneous Environments," IEEE, 1994, pp. 124-126.
Huff, KL, "Data Set Usage Sequence Number," IBM Technical Disclosure Bulletin, vol. 24, No. 5, Oct. 1981 New York, US, pp. 2404-2406.
Rosenblum et al., "The Design and Implementation of a Log-Structure File System," Operating Systems Review SIGOPS, vol. 25, No. 5, May 1991, New York, US, pp. 1-15.

\* cited by examiner

SYSTEMS AND METHODS FOR DATABASE ARCHIVING

INCORPORATION BY REFERENCE TO RELATED APPLICATIONS

This application is a continuation of U.S. patent application Ser. No. 13/786,928, filed Mar. 6, 2013, which claims the benefit of priority under 35 U.S.C. §119(e) of U.S. Provisional Application No. 61/674,207 filed on Jul. 20, 2012 and entitled "DATABASE ARCHIVING IN A DATA STORAGE SYSTEM", the entirety of which is incorporated herein by reference. Any and all priority claims identified in the Application Data Sheet, or any correction thereto, are hereby incorporated by reference under 37 CFR 1.57.

BACKGROUND

Businesses worldwide recognize the commercial value of their data and seek reliable, cost-effective ways to protect the information stored on their computer networks while minimizing impact on productivity. Protecting information is often part of a routine process that is performed within an organization.

A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques for reducing redundant data, pruning lower priority data, etc.

Enterprises also increasingly view their stored data as a valuable asset. Along these lines, customers are looking for solutions that not only protect and manage, but also leverage their data. For instance, solutions providing data analysis capabilities, improved data presentation and access features, and the like, are in increasing demand.

SUMMARY

As enterprises generate ever increasing volumes of data, data stored in databases can include millions of records. Such data may be archived as part of the data protection plan. However, archiving databases can pose special challenges. Database data is generally highly inter-related, e.g., records stored in different tables are generally related to each other. As such, archiving a particular record in one table often entails also archiving records in other tables that relate to that record. This is because records are copied to secondary storage and then pruned from primary storage as part of the archiving process. And if a record is pruned without identifying and copying over other tables that reference that record, the integrity of the database may be compromised. Moreover, there are different types of database applications each having different schema for relating the data, commands, and the like. In addition, traversing through the tables to identify the records to archive and extracting them can take a long period of time since a database may contain large volumes of data.

Due to the above challenges, there is a need for a data storage system that implements database archiving in an efficient manner. In order to address these and other challenges, certain storage systems disclosed herein archive data associated with various different types of database applications using knowledge of database specific schema and database specific commands. A data storage system according to certain aspects may provide a database archiving module that is specific to each database application used in the system. For instance, a data storage system may include one or more of an Oracle, IBM DB2, and Microsoft SQL Server database applications executing thereon. Depending on the installed database applications, the data storage system can provide an Oracle database archiving module, a DB2 database archiving module, and/or an SQL Server database archiving module, as appropriate. Each database specific archiving module includes logic that incorporates and/or is based on the native schema and/or native commands specific to a particular database application.

As mentioned above, archiving data in a database can pose special challenges because the data in a database is highly related. For example, data relating to an employee of a corporation may span multiple tables in a database. The Employee table may contain basic information about the employee, such as name, Social Security Number, address, telephone number, etc. The Department table may contain data about different departments within the corporation. Each employee may belong to one department, and the department information for an employee may also be included in the Employee table. In order to archive data for Employee A, the record for Employee A in the Employee table needs to be copied to the target storage device, as well as all records in other tables that relate to and/or reference the record for Employee A in the Employee table. The related records for Employee A are archived together to preserve the integrity of the database. If the record for Employee A in the Employee table were archived by itself, the references to the record in other tables will become invalid after the record for Employee A is pruned from the Employee table. Because the database archiving module implements logic that incorporates and/or is based on the native schema of the corresponding type of database application, the archiving module can "understand" and parse through the database to identify the relationship between the tables in the database, e.g., to construct rules for extracting and archiving the data that is selected for archiving.

Moreover, because a database generally contains large volumes of data, e.g., on a scale of millions of records, traversing through the records in a database can require a long period of time. Using the "native database interface" (e.g., native database commands) of a particular database can make the archiving process faster and more efficient. Thus, the database archiving module can be configured to employ the native database interface to archive, e.g., to extract, copy, and prune data, and thus improve the database archiving process.

In some embodiments, a method is provided for archiving data generated by one or more database applications in a networked data storage system. The method comprises receiving instructions to archive a logical subset of data in a stored database. The data is organized in a plurality of tables, generated by a database application residing on a first client computing device, and stored in a first information store associated with the first client computing device. The method further comprises processing, by one or more processors, the database data according to a native schema of the database application to identify data items in the stored database that correspond to the logical subset. The method also comprises accessing the identified data items from the stored database, copying the accessed data items to one or more secondary storage devices to create a secondary copy of the data items, and following said copying, pruning the identified data items from the stored database.

According to certain embodiments, a data storage system configured to archive data generated by one or more database applications is provided. The data storage system comprises a client computing device and a database archiving module executing in one or more processors of the client computing device. The module is configured to receive instructions to archive a logical subset of data in a stored database. The data is organized in a plurality of tables, generated by a database application residing on a first client computing device, and stored in a first information store associated with the first client computing device. The module is further configured to process the database data according to a native schema of the database application to identify data items in the stored database that correspond to the logical subset, access the identified data items from the stored database, copy the accessed data items to one or more secondary storage devices to create a secondary copy of the data items, and following said copying, prune the identified data items from the stored database.

According to another aspect of the disclosure, a computer readable medium comprising instructions for archiving data generated by one or more database applications in a networked data storage system is provided. The instructions cause a processor to receive instructions to archive a logical subset of data in a stored database. The data is organized in a plurality of tables, generated by a database application residing on a first client computing device, and stored in a first information store associated with the first client computing device. The instructions further cause a processor to process the database data according to a native schema of the database application to identify data items in the stored database that correspond to the logical subset, access the identified data items from the stored database, copy the accessed data items to one or more secondary storage devices to create a secondary copy of the data items, and following said copying, prune the identified data items from the stored database.

DETAILED DESCRIPTION

Systems and methods are described herein for implementing archiving of database data in a data storage system. Examples of such systems and methods are discussed in further detail herein, e.g., with respect to FIGS. 2-5. Archiving of database data may additionally be implemented by information management systems such as those that will now be described with respect to FIGS. 1A-1E. And, as will be described, the componentry and methods for implementing database archiving described herein can be incorporated into and implemented by such systems.
Information Management System Overview With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions have been applied in other cases. These solutions were often provided by different vendors and had limited or no interoperability.

Figure 1A:
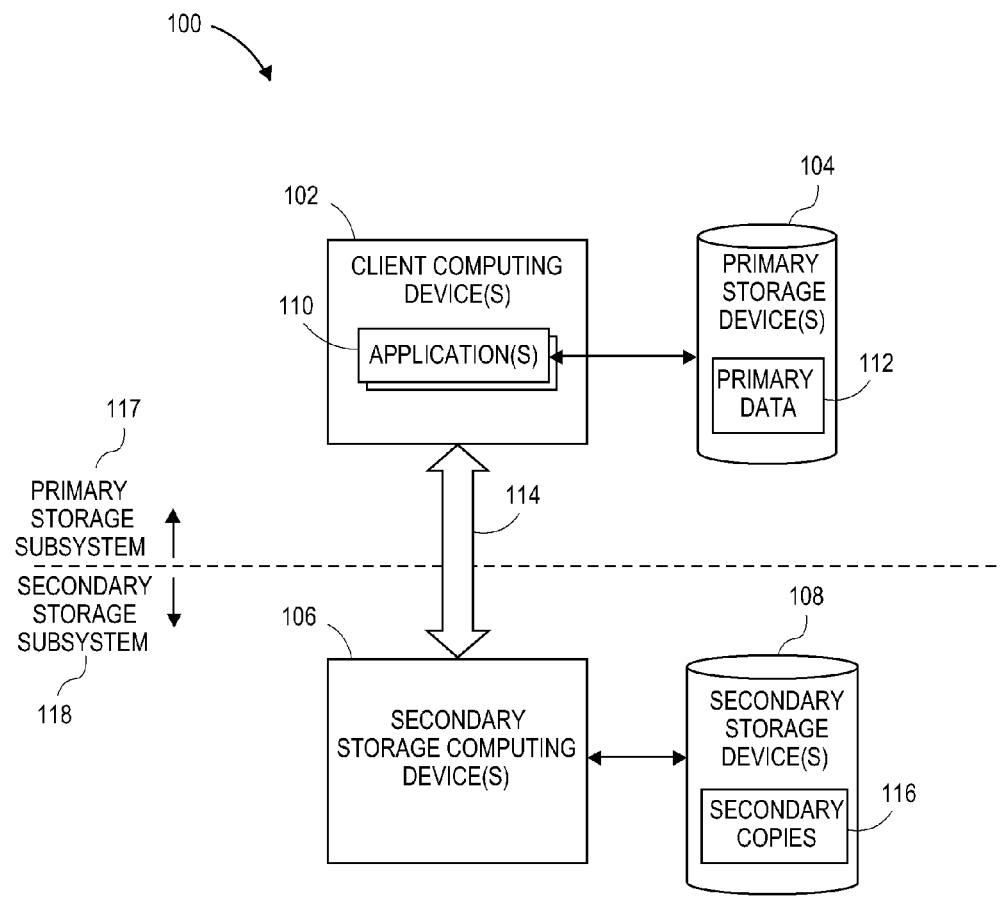
FIG. 1A is a block diagram illustrating an exemplary information management system.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata generated and used by the various computing devices in the information management system 100.

The organization which employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

- U.S. Pat. Pub. No. 2010-0332456, entitled "DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES";
- U.S. Pat. No. 7,035,880, entitled "MODULAR BACKUP AND RETRIEVAL SYSTEM USED IN CONJUNCTION WITH A STORAGE AREA NETWORK";
- U.S. Pat. No. 7,343,453, entitled "HIERARCHICAL SYSTEMS AND METHODS FOR PROVIDING A UNIFIED VIEW OF STORAGE INFORMATION";
- U.S. Pat. No. 7,395,282, entitled "HIERARCHICAL BACKUP AND RETRIEVAL SYSTEM";

U.S. Pat. No. 7,246,207, entitled "SYSTEM AND METHOD FOR DYNAMICALLY PERFORMING STORAGE OPERATIONS IN A COMPUTER NETWORK";

U.S. Pat. No. 7,747,579, entitled "METABASE FOR FACILITATING DATA CLASSIFICATION";

U.S. Pat. No. 8,229,954, entitled "MANAGING COPIES OF DATA";

U.S. Pat. No. 7,617,262, entitled "SYSTEM AND METHODS FOR MONITORING APPLICATION DATA IN A DATA REPLICATION SYSTEM";

U.S. Pat. No. 7,529,782, entitled "SYSTEM AND METHODS FOR PERFORMING A SNAPSHOT AND FOR RESTORING DATA";

U.S. Pat. No. 8,230,195, entitled "SYSTEM AND METHOD FOR PERFORMING AUXILIARY STORAGE OPERATIONS";

U.S. Pat. No. 8,364,652, entitled "CONTENT-ALIGNED, BLOCK-BASED DEDUPLICATION";

U.S. Pat. Pub. No. 2006/0224846, entitled "SYSTEM AND METHOD TO SUPPORT SINGLE INSTANCE STORAGE OPERATIONS";

U.S. Pat. Pub. No. 2009/0329534, entitled "APPLICATION-AWARE AND REMOTE SINGLE INSTANCE DATA MANAGEMENT";

U.S. Pat. Pub. No. 2012/0150826, entitled "DISTRIBUTED DEDUPLICATED STORAGE SYSTEM";

U.S. Pat. Pub. No. 2012/0150818, entitled "CLIENT-SIDE REPOSITORY IN A NETWORKED DEDUPLICATED STORAGE SYSTEM";

U.S. Pat. No. 8,170,995, entitled "METHOD AND SYSTEM FOR OFFLINE INDEXING OF CONTENT AND CLASSIFYING STORED DATA"; and U.S. Pat. No. 8,156,086, entitled "SYSTEMS AND METHODS FOR STORED DATA VERIFICATION".

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117.

Depending on the context, the term "information management system" can refer to generally all of the illustrated hardware and software components. Or, in other instances, the term may refer to only a subset of the illustrated components.

For instance, in some cases information management system 100 generally refers to a combination of specialized components used to protect, move, manage, manipulate and/or process data and metadata generated by the client computing devices 102. However, the term may generally not refer to the underlying components that generate and/or store the primary data 112, such as the client computing devices 102 themselves, the applications 110 and operating system residing on the client computing devices 102, and the primary storage devices 104.

As an example, "information management system" may sometimes refer only to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, or the like. In the information management system 100, the data generation sources include the one or more client computing devices 102.

The client computing devices 102 may include, without limitation, one or more: workstations, personal computers, desktop computers, or other types of generally fixed computing systems such as mainframe computers and minicomputers.

The client computing devices 102 can also include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc.

In some cases, each client computing device 102 is associated with one or more users and/or corresponding user accounts, of employees or other individuals.

The term "client computing device" is used herein because the information management system 100 generally "serves" the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

The client computing devices 102 may additionally include virtualized and/or cloud computing resources. For instance, one or more virtual machines may be provided to the organization by a third-party cloud service vendor. Or, in some embodiments, the client computing devices 102 include one or more virtual machine(s) running on a virtual machine host computing device operated by the organization. As one example, the organization may use one virtual machine as a database server and another virtual machine as a mail server. A virtual machine manager (VMM) (e.g., a Hypervisor) may manage the virtual machines, and reside and execute on the virtual machine host computing device.

Each client computing device 102 may have one or more applications 110 (e.g., software applications) executing thereon which generate and manipulate the data that is to be protected from loss.

The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, browser applications, mobile applications, entertainment applications, and so on.

The applications 110 can include at least one operating system (e.g., Microsoft Windows, Mac OS X, iOS, IBM z/OS, Linux, other Unix-based operating systems, etc.), which may support one or more file systems and host the other applications 110.

As shown, the client computing devices 102 and other components in the information management system 100 can be connected to one another via one or more communication pathways 114. The communication pathways 114 can include one or more networks or other connection types including as any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs.

Primary Data and Exemplary Primary Storage Devices

Primary data 112 according to some embodiments is production data or other "live" data generated by the operating system and other applications 110 residing on a client computing device 102. The primary data 112 is stored on the primary storage device(s) 104 and is organized via a file system supported by the client computing device 102. For instance, the client computing device(s) 102 and corresponding applications 110 may create, access, modify, write, delete, and otherwise use primary data 112.

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary data 112 may sometimes be referred to as a "primary copy" in the sense that it is a discrete set of data. However, the use of this term does not necessarily imply that the "primary copy" is a copy in the sense that it was copied or otherwise derived from another stored version.

The primary storage devices 104 storing the primary data 112 may be relatively fast and/or expensive (e.g., a disk drive, a hard-disk array, solid state memory, etc.). In addition, primary data 112 may be intended for relatively short term retention (e.g., several hours, days, or weeks).

According to some embodiments, the client computing device 102 can access primary data 112 from the primary storage device 104 by making conventional file system calls via the operating system. Primary data 112 representing files may include structured data (e.g., database files), unstructured data (e.g., documents), and/or semi-structured data. Some specific examples are described below with respect to FIG. 1B.

It can be useful in performing certain tasks to break the primary data 112 up into units of different granularities. In general, primary data 112 can include files, directories, file system volumes, data blocks, extents, or any other types or granularities of data objects. As used herein, a "data object" can refer to both (1) any file that is currently addressable by a file system or that was previously addressable by the file system (e.g., an archive file) and (2) a subset of such a file.

As will be described in further detail, it can also be useful in performing certain functions of the information management system 100 to access and modify metadata within the primary data 112. Metadata generally includes information about data objects or characteristics associated with the data objects.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), frequency of change (e.g., a period in which the data object is modified), business unit (e.g., a group or department that generates, manages or is otherwise associated with the data object), and aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or the like.

In addition to metadata generated by or related to file systems and operating systems, some of the applications 110 maintain indices of metadata for data objects, e.g., metadata associated with individual email messages. Thus, each data object may be associated with corresponding metadata. The use of metadata to perform classification and other functions is described in greater detail below.

Each of the client computing devices 102 are associated with and/or in communication with one or more of the primary storage devices 104 storing corresponding primary data 112. A client computing device 102 may be considered to be "associated with" or "in communication with" a primary storage device 104 if it is capable of one or more of: storing data to the primary storage device 104, retrieving data from the primary storage device 104, and modifying data retrieved from a primary storage device 104.

The primary storage devices 104 can include, without limitation, disk drives, hard-disk arrays, semiconductor memory (e.g., solid state drives), and network attached storage (NAS) devices. In some cases, the primary storage devices 104 form part of a distributed file system. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

In some cases, each primary storage device 104 is dedicated to an associated client computing devices 102. For instance, a primary storage device 104 in one embodiment is a local disk drive of a corresponding client computing device 102. In other cases, one or more primary storage devices 104 can be shared by multiple client computing devices 102. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications).

Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged or otherwise corrupted.

For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may be referred to in some cases as a secondary storage subsystem 118.

Creation of secondary copies 116 can help meet information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

Types of secondary copy operations can include, without limitation, backup operations, archive operations, snapshot operations, replication operations (e.g., continuous data replication [CDR]), data retention policies such as information lifecycle management and hierarchical storage management operations, and the like. These specific types operations are discussed in greater detail below.

Regardless of the type of secondary copy operation, the client computing devices 102 access or receive primary data 112 and communicate the data, e.g., over the communication pathways 114, for storage in the secondary storage device(s) 108.

A secondary copy 116 can comprise a separate stored copy of application data that is derived from one or more earlier created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108.

Since an instance a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also often stored on a secondary storage device 108 that is inaccessible to the applications 110 running on the client computing devices 102 (and/or hosted services). Some secondary copies 116 may be "offline copies," in that they are not readily available (e.g. not mounted to tape or disk). Offline copies can include copies of data that the information management system 100 can access without human intervention (e.g. tapes within an automated tape library, but not yet mounted in a drive), and copies that the information management system 100 can access only with at least some human intervention (e.g. tapes located at an offsite storage site).

The secondary storage devices 108 can include any suitable type of storage device such as, without limitation, one or more tape libraries, disk drives or other magnetic, non-tape storage devices, optical media storage devices, solid state storage devices, NAS devices, combinations of the same, and the like. In some cases, the secondary storage devices 108 are provided in a cloud (e.g. a private cloud or one operated by a third-party vendor).

The secondary storage device(s) 108 in some cases comprises a disk array or a portion thereof. In some cases, a single storage device (e.g., a disk array) is used for storing both primary data 112 and at least some secondary copies 116. In one example, a disk array capable of performing hardware snapshots stores primary data 112 and creates and stores hardware snapshots of the primary data 112 as secondary copies 116.

The Use of Intermediary Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediary components can provide other benefits. For instance, as discussed further below with respect to FIG. 1D, distributing some of the work involved in creating secondary copies 116 can enhance scalability.

The intermediary components can include one or more secondary storage computing devices 106 as shown in FIG. 1A and/or one or more media agents, which can be software modules residing on corresponding secondary storage computing devices 106 (or other appropriate devices). Media agents are discussed below (e.g., with respect to FIGS. 1C-1E).

The secondary storage computing device(s) 106 can comprise any appropriate type of computing device and can include, without limitation, any of the types of fixed and portable computing devices described above with respect to the client computing devices 102. In some cases, the secondary storage computing device(s) 106 include specialized hardware and/or software componentry for interacting with the secondary storage devices 108.

To create a secondary copy 116, the client computing device 102 communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections).

Exemplary Primary Data and an Exemplary Secondary Copy

Figure 1B:
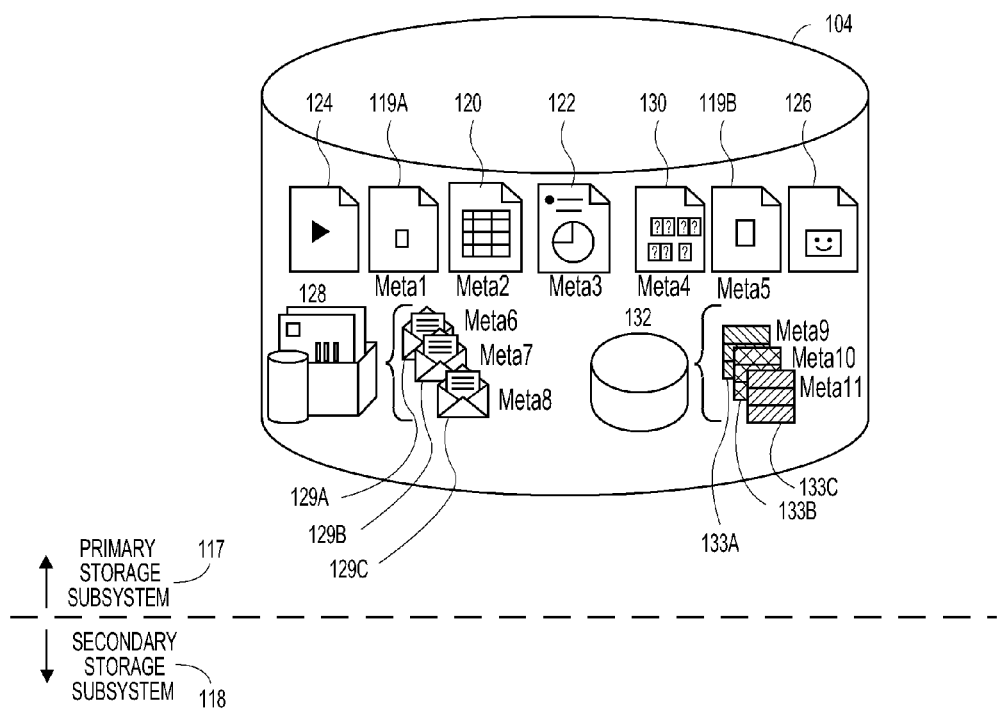
FIG. 1B is a detailed view of a primary storage device, a secondary storage device, and some examples of primary data and secondary copy data.
Figure 1B:
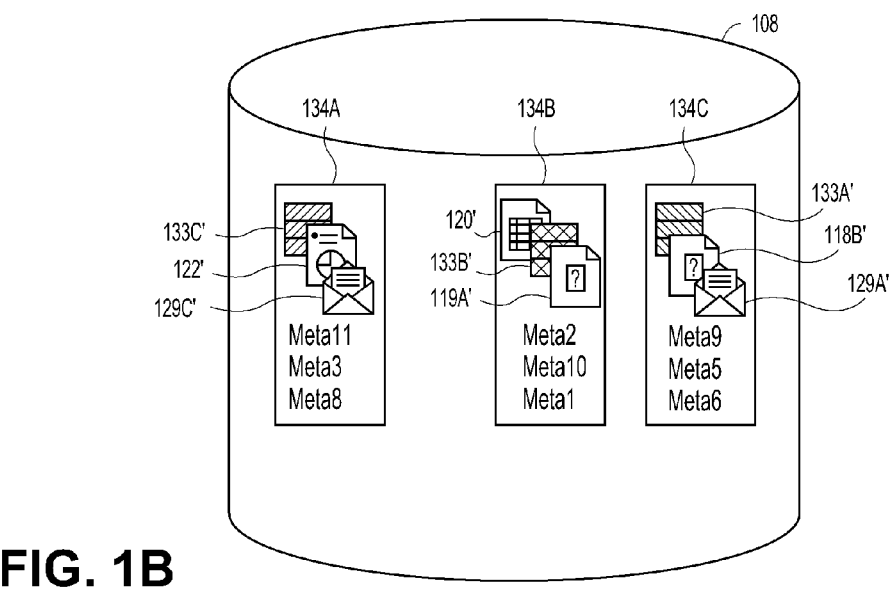

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables 133A-133C).

Some or all primary data objects are associated with a primary copy of object metadata (e.g., "Meta1-11"), which may be file system metadata and/or application specific metadata. Stored on the secondary storage device(s) 108 are secondary copy objects 134A-C which may include copies of or otherwise represent corresponding primary data objects and metadata.

As shown, the secondary copy objects 134A-C can individually represent more than one primary data object. For example, secondary copy data object 134A represents three separate primary data objects 133C, 122 and 129C (represented as 133C', 122' and 129C', respectively). Moreover, as indicated by the prime mark ('), a secondary copy object may store a representation of a primary data object or metadata differently than the original format, e.g., in a compressed, encrypted, deduplicated, or other modified format.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
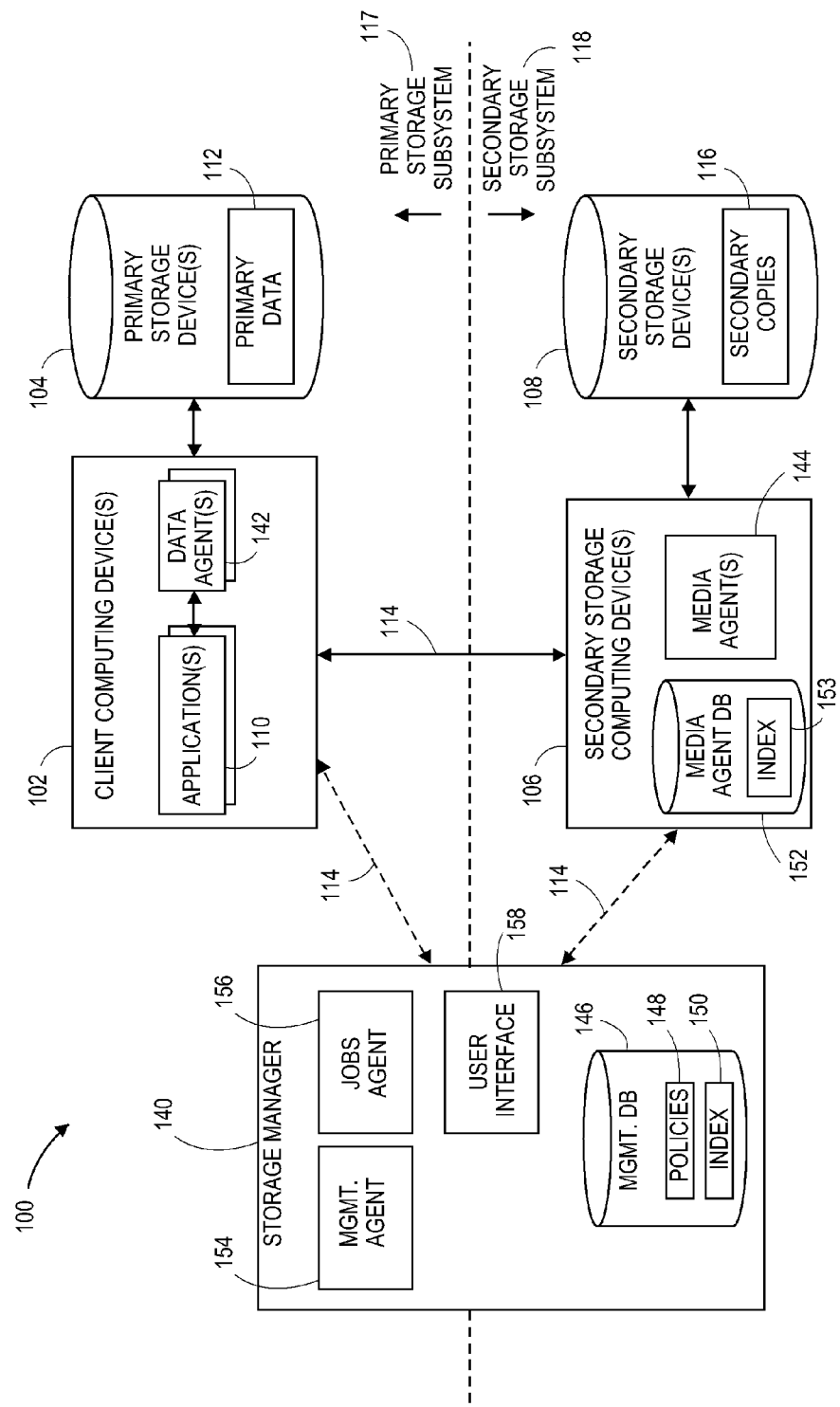
FIG. 1C is a block diagram of an exemplary information management system including a storage manager, one or more data agents, and one or more media agents.

FIG. 1C shows an information management system 100 designed according to these considerations and which includes: a central storage or information manager 140 configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization.

For these and other reasons, according to certain embodiments, responsibility for controlling the information management system 100, or at least a significant portion of that responsibility, is allocated to the storage manager 140.

By distributing control functionality in this manner, the storage manager 140 can be adapted independently according to changing circumstances. Moreover, a host computing device can be selected to best suit the functions of the storage manager 140. These and other advantages are described in further detail below with respect to FIG. 1D.

The storage manager 140 may be a software module or other application. The storage manager generally initiates, coordinates and/or controls storage and other information management operations performed by the information management system 100, e.g., to protect and control the primary data 112 and secondary copies 116 of data and metadata.

As shown by the dashed, arrowed lines, the storage manager 140 may communicate with and/or control some or all elements of the information management system 100, such as the data agents 142 and media agents 144. Thus, in certain embodiments, control information originates from the storage manager 140, whereas payload data and metadata is generally communicated between the data agents 142 and the media agents 144 (or otherwise between the client computing device(s) 102 and the secondary storage computing device(s) 106), e.g., at the direction of the storage manager 140. In other embodiments, some information management operations are controlled by other components in the information management system 100 (e.g., the media agent(s) 144 or data agent(s) 142), instead of or in combination with the storage manager 140.

According to certain embodiments, the storage manager provides one or more of the following functions:
  initiating execution of secondary copy operations;
  managing secondary storage devices 108 and inventory/capacity of the same;
  allocating secondary storage devices 108 for secondary storage operations;
  monitoring completion of and providing status reporting related to secondary storage operations;
  tracking age information relating to secondary copies 116, secondary storage devices 108, and comparing the age information against retention guidelines;
  tracking movement of data within the information management system 100;
  tracking logical associations between components in the information management system 100;
  protecting metadata associated with the information management system 100; and
  implementing operations management functionality.

The storage manager 140 may maintain a database 146 of management-related data and information management policies 148. The database 146 may include a management index 150 or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108.

Administrators and other employees may be able to manually configure and initiate certain information management operations on an individual basis. But while this may be acceptable for some recovery operations or other relatively less frequent tasks, it is often not workable for implementing on-going organization-wide data protection and management.

Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface through which users and system processes can retrieve information about the status of information management operations (e.g., storage operations) or issue instructions to the information management system 100 and its constituent components.

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158.

Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

In general, the management agent 154 allows multiple information management systems 100 to communicate with one another. For example, the information management system 100 in some cases may be one information management subsystem or "cell" of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in U.S. Pat. No. 7,035,880, which is incorporated by reference herein.

Data Agents

As discussed, a variety of different types of applications 110 can reside on a given client computing device 102, including operating systems, database applications, e-mail applications, and virtual machines, just to name a few. And, as part of the as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences between applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations. For instance, the data agent 142 may take part in performing data storage operations such as the copying, archiving, migrating, replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, e.g., encryption and deduplication.

As indicated, each data agent 142 may be specialized for a particular application 110, and the system can employ multiple data agents 142, each of which may backup, migrate, and recover data associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, one data agent 142 may be used for each data type to copy, archive, migrate, and restore the client computing device 102 data. For example, to backup, migrate, and restore all of the data on a Microsoft Exchange server, the client computing device 102 may use one Microsoft Exchange Mailbox data agent 142 to backup the Exchange mailboxes, one Microsoft Exchange Database data agent 142 to backup the Exchange databases, one Microsoft Exchange Public Folder data agent 142 to backup the Exchange Public Folders, and one Microsoft Windows File System data agent 142 to backup the file system of the client computing device 102. In such embodiments, these data agents 142 may be treated as four separate data agents 142 even though they reside on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediary components such as the media agent(s) 144 can provide a number of benefits including improved client computing device 102 operation, faster secondary copy operation performance, and enhanced scalability. As one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108.

Media agents 144 can comprise logically and/or physically separate nodes in the information management system 100 (e.g., separate from the client computing devices 102, storage manager 140, and/or secondary storage devices 108). In addition, each media agent 144 may reside on a dedicated secondary storage computing device 106 in some cases, while in other embodiments a plurality of media agents 144 reside on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, and coordinating the retrieval of data from a particular secondary storage device 108.

While media agent(s) 144 are generally associated with one or more secondary storage devices 108, the media agents 144 in certain embodiments are physically separate from the secondary storage devices 108. For instance, the media agents 144 may reside on secondary storage computing devices 106 having different housings or packages than the secondary storage devices 108. In one example, a media agent 144 resides on a first server computer and is in communication with a secondary storage device(s) 108 residing in a separate, rack-mounted RAID-based system.

In operation, a media agent 144 associated with a particular secondary storage device 108 may instruct the secondary storage device 108 (e.g., a tape library) to use a robotic arm or other retrieval means to load or eject a certain storage media, and to subsequently archive, migrate, or retrieve data to or from that media, e.g., for the purpose of restoring the data to a client computing device 102. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 resides. In other cases, the media agent database 152 is stored remotely from the secondary storage computing device 106.

The media agent database 152 can include, among other things, an index 153 including data generated during secondary copy operations and other storage or information management operations. The index 153 provides a media agent 144 or other component with a fast and efficient mechanism for locating secondary copies 116 or other data stored in the secondary storage devices 108. In one configuration, a storage manager index 150 or other data structure may store data associating a client computing device 102 with a particular media agent 144 and/or secondary storage device 108, as specified in a storage policy. A media agent index 153 or other data structure associated with the particular media agent 144 may in turn include information about the stored data.

For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use in storage operations and other activities without having to be first retrieved from the secondary storage device 108. In yet further embodiments, some or all of the data in the index 153 may instead or additionally be stored along with the data in a secondary storage device 108, e.g., with a copy of the index 153.

Because the index 153 maintained in the database 152 may operate as a cache, it can also be referred to as an index cache. In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may reside on computing devices that are physically separate from one another. This architecture can provide a number of benefits.

For instance, hardware and software design choices for each distributed component can be targeted to suit its particular function. The secondary computing devices 106 on which the media agents 144 reside can be tailored for interaction with associated secondary storage devices 108 and provide fast index cache operation, among other specific tasks. Similarly, the client computing device(s) 102 can be selected to effectively service the applications 110 residing thereon, in order to efficiently produce and store primary data 112.

Moreover, in some cases, one or more of the individual components in the information management system 100 can be distributed to multiple, separate computing devices. As one example, for large file systems where the amount of data stored in the storage management database 146 is relatively large, the management database 146 may be migrated to or otherwise reside on a specialized database server (e.g., an SQL server) separate from a server that implements the other functions of the storage manager 140. This configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss incident at the primary site. Or the database 146 can be replicated to another computing device within the same site, such as to a higher performance machine in the event that a storage manager host device can no longer service the needs of a growing information management system 100.

Figure 1D:
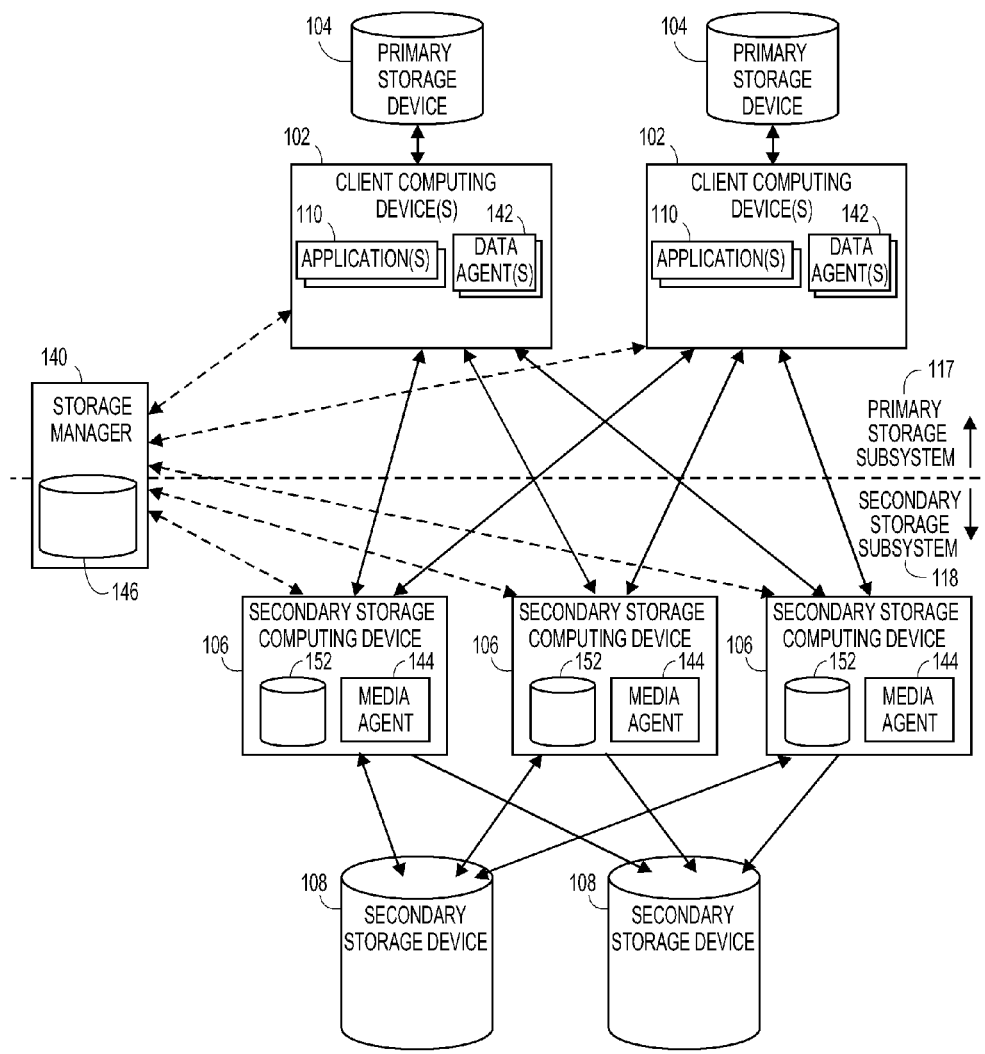
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage devices 106 (and corresponding media agents 144), and/or secondary storage devices 108.

Moreover, each client computing device 102 in some embodiments can communicate with any of the media agents 144, e.g., as directed by the storage manager 140. And each media agent 144 may be able to communicate with any of the secondary storage devices 108, e.g., as directed by the storage manager 140. Thus, operations can be routed to the secondary storage devices 108 in a dynamic and highly flexible manner. Further examples of scalable systems capable of dynamic storage operations are provided in U.S. Pat. No. 7,246,207, which is incorporated by reference herein.

In alternative configurations, certain components are not distributed and may instead reside and execute on the same computing device. For example, in some embodiments one or more data agents 142 and the storage manager 140 reside on the same client computing device 102. In another embodiment, one or more data agents 142 and one or more media agents 144 reside on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, and management operations.

Data Movement Operations

Data movement operations according to certain embodiments are generally operations that involve the copying or migration of data (e.g., payload data) between different locations in the information management system 100. For example, data movement operations can include operations in which stored data is copied, migrated, or otherwise transferred from primary storage device(s) 104 to secondary storage device(s) 108, from secondary storage device(s) 108 to different secondary storage device(s) 108, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication operations, single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of primary data 112 at a particular point in time. Each subsequent backup copy may be maintained independently of the first. Further, a backup copy in some embodiments is stored in a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at on offsite location.

Backup operations can include full, synthetic or incremental backups. A full backup in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Any of the above types of backup operations can be at the file-level, e.g., where the information management system 100 generally tracks changes to files at the file-level, and includes copies of files in the backup copy. In other cases, block-level backups are employed, where files are broken into constituent blocks, and changes are tracked at the block-level. Upon restore, the information management system 100 reassembles the blocks into files in a transparent fashion.

Far less data may actually be transferred and copied to the secondary storage devices 108 during a block-level copy than during a file-level copy, resulting in faster execution times. However, when restoring a block-level copy, the process of locating constituent blocks can sometimes result in longer restore times as compared to file-level backups.

Similar to backup operations, the other types of secondary copy operations described herein can also be implemented at either the file-level or the block-level.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) from the source copy may be removed from source storage. Archive copies are sometimes stored in an archive format or other non-native application format. The source data may be primary data 112 or a secondary copy 116, depending on the situation. As with backup copies, archive copies can be stored in a format in which the data is compressed, encrypted, deduplicated, and/or otherwise modified from the original application format.

In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the archived primary data 112 or a portion thereof is deleted when creating the archive copy. Thus, archiving can serve the purpose of freeing up space in the primary storage device(s) 104. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies.

Snapshot Operations

Snapshot operations can provide a relatively lightweight, efficient mechanism for protecting data. From an end-user viewpoint, a snapshot may be thought of as an "instant" image of the primary data 112 at a given point in time. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Some types of snapshots do not actually create another physical copy of all the data as it existed at the particular point in time, but may simply create pointers that are able to map files and directories to specific memory locations (e.g., disk blocks) where the data resides, as it existed at the particular point in time. For example, a snapshot copy may include a set of pointers derived from the file system or an application. Each pointer points to a respective stored data block, so collectively, the set of pointers reflect the storage location and state of the data object (e.g., file(s) or volume(s) or data set(s)) at a particular point in time when the snapshot copy was created.

In some embodiments, once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually modified later. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage. The snapshot mapping of file system data is also updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data was the "live", primary data 112. This can reduce access time, storage utilization, and impact on source applications 110, among other benefits.

Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication, which is useful to reduce the amount of data within the system. For instance, some or all of the above-described secondary storage operations can involve deduplication in some fashion. New data is read, broken down into blocks (e.g., sub-file level blocks) of a selected granularity, compared with blocks that are already stored, and only the new blocks are stored. Blocks that already exist are represented as pointers to the already stored data.

In order to stream-line the comparison process, the information management system 100 may calculate and/or store signatures (e.g., hashes) corresponding to the individual data blocks and compare the hashes instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy. Moreover, single-instancing in some cases is distinguished from deduplication as a process of analyzing and reducing data at the file level, rather than the sub-file level.

Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. Pub. No. 2012/0084269, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., data-block signatures). Examples of such a configuration are provided in U.S. Pat. Pub. No. 2012/0150826, which is incorporated by reference herein. Deduplication can also be performed on the "source-side" (or "client-side"), e.g., to reduce the amount of traffic between the media agents 144 and the client computing device(s) 102 and/or reduce redundant data stored in the primary storage devices 104. Examples of such deduplication techniques are provided in U.S. Pat. Pub. No. 2012/0150818, which is incorporated by reference herein.

Information Lifecycle Management and Hierarchical Storage

Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source copy is replaced by a logical reference pointer or stub. The reference pointer or stub can be stored in the primary storage device 104 to replace the deleted data in primary data 112 (or other source copy) and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and often make recovery of the data appear transparent, even though the HSM data may be stored at a location different from the remaining source data. The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies".

Auxiliary Copy and Disaster Recovery Operations

An auxiliary copy is generally a copy operation in which a copy is created of an existing secondary copy 116. For instance, an initial or "primary" secondary copy 116 may be generated using or otherwise be derived from primary data 112, whereas an auxiliary copy is generated from the initial secondary copy 116. Auxiliary copies can be used to create additional standby copies of data and may reside on different secondary storage devices 108 than initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Processing and Manipulation Operations

As indicated, the information management system 100 can also be configured to implement certain data manipulation operations, which according to certain embodiments are generally operations involving the processing or modification of stored data. Some data manipulation operations include content indexing operations and classification operations can be useful in leveraging the data under management to provide enhanced search and other features. Other data manipulation operations such as compression and encryption can provide data reduction and security benefits, respectively.

Data manipulation operations can be different than data movement operations in that they do not necessarily involve the copying, migration or other transfer of data (e.g., primary data 112 or secondary copies 116) between different locations in the system. For instance, data manipulation operations may involve processing (e.g., offline processing) or modification of already stored primary data 112 and/or secondary copies 116. However, in some embodiments data manipulation operations are performed in conjunction with data movement operations. As one example, the information management system 100 may encrypt data while performing an archive operation.

Content Indexing

In some embodiments, the information management system 100 "content indexes" data stored within the primary data 112 and/or secondary copies 116, providing enhanced search capabilities for data discovery and other purposes. The content indexing can be used to identify files or other data objects having pre-defined content (e.g., user-defined keywords or phrases), metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

Classification Operations—Metabase

In order to help leverage the data stored in the information management system 100, one or more components can be configured to scan data and/or associated metadata for classification purposes to populate a metabase of information. Such scanned, classified data and/or metadata may be included in a separate database and/or on a separate storage device from primary data 112 (and/or secondary copies 116), such that metabase related operations do not significantly impact performance on other components in the information management system 100.

In other cases, the metabase(s) may be stored along with primary data 112 and/or secondary copies 116. Files or other data objects can be associated with user-specified identifiers (e.g., tag entries) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100.

The information management system 100 in some cases encrypts the data at the client level, such that the client computing devices 102 (e.g., the data agents 142) encrypt the data prior to forwarding the data to other components, e.g., before sending the data media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies. In yet further embodiments, the secondary storage devices 108 can implement built-in, high performance hardware encryption.

Management Operations

Certain embodiments leverage the integrated, ubiquitous nature of the information management system 100 to provide useful system-wide management functions. As two non-limiting examples, the information management system 100 can be configured to implement operations management and e-discovery functions.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like.

Such information can be provided to users via the user interface 158 in a single, integrated view. For instance, the integrated user interface 158 can include an option to show a "virtual view" of the system that graphically depicts the various components in the system using appropriate icons. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., network pathways, etc.), and other information. The user may also drill down or use other means to obtain more detailed information regarding a particular component, job, or the like.

In some cases the information management system 100 alerts a user such as a system administrator when a particular resource is unavailable or congested. For example, a particular primary storage device 104 or secondary storage device 108 might be full or require additional capacity. Or a component may be unavailable due to hardware failure, software problems, or other reasons. In response, the information management system 100 may suggest solutions to such problems when they occur (or provide a warning prior to occurrence). For example, the storage manager 140 may alert the user that a secondary storage device 108 is full or otherwise congested. The storage manager 140 may then suggest, based on job and data storage information contained in its database 146, an alternate secondary storage device 108.

Other types of corrective actions may include suggesting an alternate data path to a particular primary or secondary storage device 104, 108, or dividing data to be stored among various available primary or secondary storage devices 104, 108 as a load balancing measure or to otherwise optimize storage or retrieval time. Such suggestions or corrective actions may be performed automatically, if desired. Further examples of some compatible operations management techniques and of interfaces providing an integrated view of an information management system are provided in U.S. Pat. No. 7,343,453, which is incorporated by reference herein. In some embodiments, the storage manager 140 implements the operations management functions described herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy or other information management operations.

One type of information management policy 148 is a storage policy. According to certain embodiments, a storage policy generally comprises a logical container that defines (or includes information sufficient to determine) one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination.

Data associated with a storage policy can be logically organized into groups, which can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location.

Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data.

Datapath information can also be included in the storage policy. For instance, the storage policy may specify network pathways and components to utilize when moving the data to the destination storage device(s). In some embodiments, the storage policy specifies one or more media agents 144 for conveying data (e.g., one or more sub-clients) associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

The information management policies 148 may also include one or more scheduling policies specifying when and how often to perform operations. Scheduling information may specify with what frequency (e.g., hourly, weekly, daily, event-based, etc.) or under what triggering conditions secondary copy or other information management operations will take place. Scheduling policies in some cases are associated with particular components, such as particular sub-clients, client computing device 102, and the like. In one configuration, a separate scheduling policy is maintained for particular sub-clients on a client computing device 102. The scheduling policy specifies that those sub-clients are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protecting operations quickly.

Thus, in some embodiments, the information management system 100 automatically applies a default configuration to client computing device 102. As one example, when a data agent(s) 142 is installed on a client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible. For instance, the information management policies 148 can also include one or more audit or security policies. An audit policy is a set of preferences, rules and/or criteria that protect sensitive data in the information management system 100. For example, an audit policy may define "sensitive objects" as files or objects that contain particular keywords (e.g. "confidential," or "privileged") and/or are associated with particular keywords (e.g., in metadata) or particular flags (e.g., in metadata identifying a document or email as personal, confidential, etc.).

An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local storage device 104 instead. To facilitate this approval, the audit policy may further specify how a secondary storage computing device 106 or other system component should notify a reviewer that a sensitive object is slated for transfer.

In some implementations, the information management policies 148 may include one or more provisioning policies. A provisioning policy can include a set of preferences, priorities, rules, and/or criteria that specify how clients 102 (or groups thereof) may utilize system resources, such as available storage on cloud storage and/or network bandwidth. A provisioning policy specifies, for example, data quotas for particular client computing devices 102 (e.g. a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies. Moreover, while storage policies are typically associated with moving and storing data, other policies may be associated with other types of information management operations. The following is a non-exhaustive list of items the information management policies 148 may specify:

- schedules or other timing information, e.g., specifying when and/or how often to perform information management operations;
- the type of secondary copy 116 and/or secondary copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation between different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;
- a relative sensitivity (e.g., confidentiality) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Exemplary Storage Policy and Secondary Storage Operations

Figure 1E:
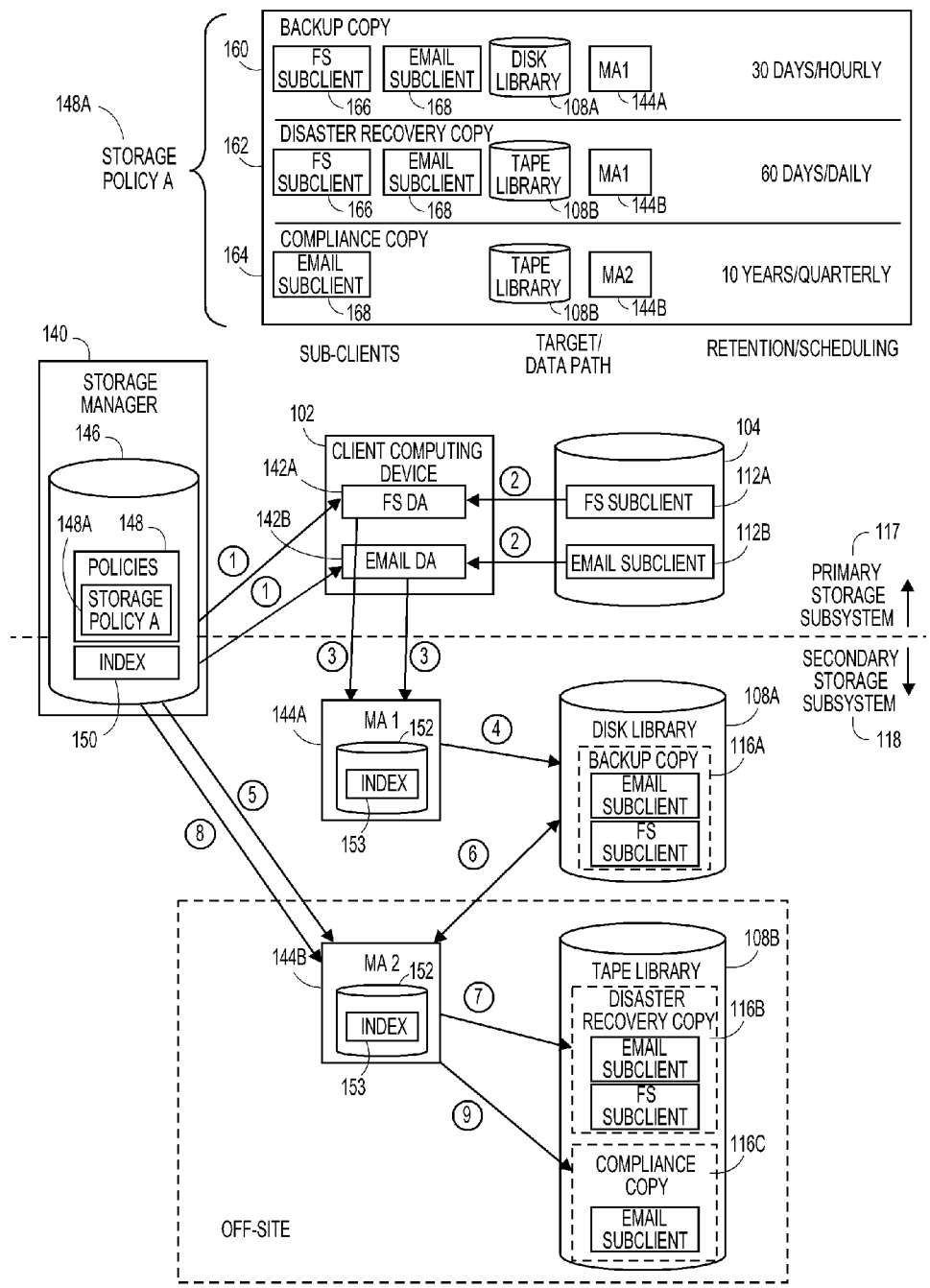
FIG. 1E illustrates certain secondary copy operations according to an exemplary storage policy.

FIG. 1E shows a data flow data diagram depicting performance of storage operations by an embodiment of an information management system 100, according to an exemplary data storage policy 148A. The information management system 100 includes a storage manger 140, a client computing device 102 having a file system data agent 142A and an email data agent 142B residing thereon, a primary storage device 104, two media agents 144A, 144B, and two secondary storage devices 108A, 108B: a disk library 108A and a tape library 108B. As shown, the primary storage device 104 includes primary data 112A, 112B associated with a file system sub-client and an email sub-client, respectively.

As indicated by the dashed box, the second media agent 144B and the tape library 108B are "off-site", and may therefore be remotely located from the other components in the information management system 100 (e.g., in a different city, office building, etc.). In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail client application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes a backup copy rule set 160, a disaster recovery copy rule set 162, and a compliance copy rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent 144B than the media agent 144A associated with the backup copy rule set 160 will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other data-loss event that would affect the backup copy 116A maintained on the disk library 108A.

The compliance copy rule set 164 is only associated with the email sub-client 166, and not the file system sub-client 168. Compliance copies generated according to the compliance copy rule set 164 will therefore not include primary data 112A from the file system sub-client 166. For instance, the organization may be under an obligation to store maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 to begin the backup operation.

At step 2, the file system data agent 142A and the email data agent 142B residing on the client computing device 102 respond to the instructions received from the storage manager 140 by accessing and processing the primary data 112A, 112B involved in the copy operation from the primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 140 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. After the 30 day retention period expires, the storage manager 140 instructs the media agent 144A to delete the backup copy 116A from the disk library 108A.

At step 5, the storage manager 140 initiates the creation of a disaster recovery copy 116B according to the disaster recovery copy rule set 162. For instance, at step 6, based on instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116C may be generated in some other manner, such as by using the primary data 112A, 112B from the storage device 104 as source data. The disaster recovery copy operation is initiated once a day and the disaster recovery copies 116A are deleted after 60 days.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, compliance copies 116C are created quarterly, and are deleted after ten years.

While not shown in FIG. 1E, at some later point in time, a restore operation can be initiated involving one or more of the secondary copies 116A, 116B, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 116A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the media agent index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files.

The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the storage manager index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 150, 153 accordingly.

During restore, chunks may be processed (e.g., by the media agent 144) according to the information in the chunk header to reassemble the files. Additional information relating to chunks can be found in U.S. Pat. No. 8,156,086, which is incorporated by reference herein.

System Overview

Figure 2:
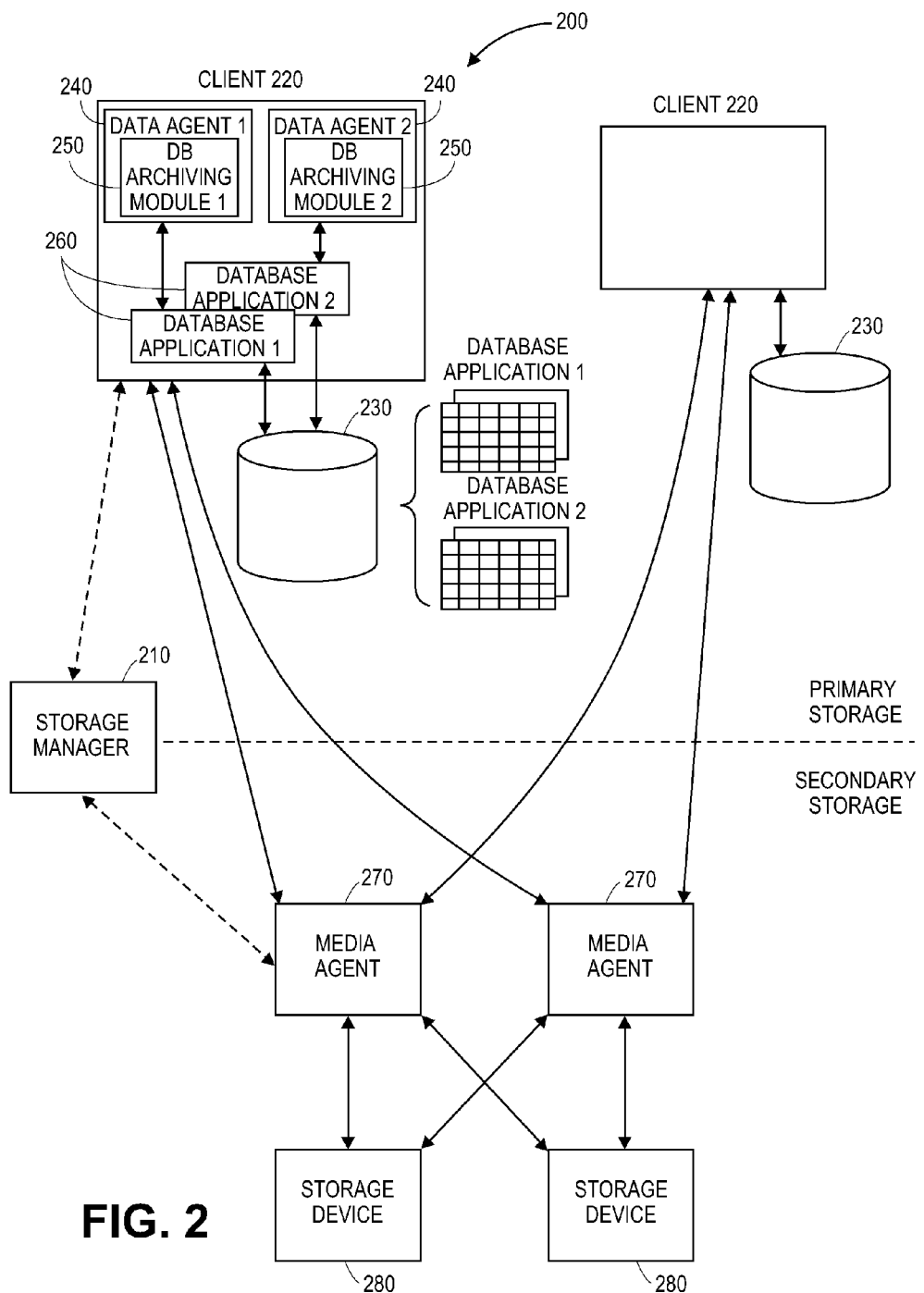
FIG. 2 is a block diagram of an example storage system configured to implement archiving database data according to certain embodiments.

FIG. 2 illustrates a block diagram of an exemplary network storage architecture compatible with embodiments described herein. The system 200 is configured to perform storage operations on electronic data in a computer network. As shown, the system includes a storage manager 210 and one or more of the following: a client 220, an information store 230, a data agent 240, a database archiving module 250, a media agent 270, and a storage device 280. In addition, the storage system can also include one or more index caches as part of the media agent 270 and/or the storage manager 210. The index caches can indicate logical associations between components of the system, user preferences, management tasks, and other useful data, as described in greater detail in application Ser. No. 10/818,749, now U.S. Pat. No. 7,246,207, issued Jul. 17, 2007, herein incorporated by reference in its entirety.

As illustrated, the client computer 220 can be communicatively coupled with the information store 230, and/or the storage manager 210. The information store 230 contains data associated with the client 220. The client 220 can also be in direct communication with the media agent 270 and/or the storage device 280. All components of the storage system 200 can be in direct communication with each other or communicate indirectly via the client 220, the storage manager 210, the media agent 270, or the like.

With further reference to FIG. 2, the client computer 220 (also generally referred to as a client) contains data in the information store 230 that can be backed up in and then restored from the storage device 280. In an illustrative embodiment, the client 220 can correspond to a wide variety of computing devices including personal computing devices, laptop computing devices, hand-held computing devices, terminal computing devices, mobile devices, wireless devices, various electronic devices, appliances and the like. In an illustrative embodiment, the client 220 includes necessary hardware and software components for establishing communication with the other components of storage system 200. For example, the client 220 can be equipped with networking equipment and browser software applications that facilitate communication with the rest of the components from storage system 200. Although not illustrated in FIG. 2, each client 220 can also display a user interface. The user interface can include various menus and fields for entering storage and restore options. The user interface can further present the results of any processing performed by the storage manager 210 in an easy to understand format.

Data agent 240 may be the same or similar to the data agents 142 described with respect to FIGS. 1C-1E. The data agent 240 can be a software module that is generally responsible for archiving, migrating, and recovering data of a client computer 220 stored in an information store 230 or other memory location. Each client computer 220 has at least one data agent 240 and the storage system 200 can support many client computers 220. The storage system 200 provides a plurality of data agents 240 each of which is intended to backup, migrate, and recover data associated with a different application 260. For example, different individual data agents 240 may be designed to handle Microsoft Exchange™ data, Microsoft Windows file system data, and other types of data known in the art.

Different individual data agents 240 may also each be associated with a different type of database application 260, such as Oracle database management system ("DBMS"), IBM DB2 DBMS, and Microsoft SQL Server DBMS. Data associated with different database applications 260 may be stored in the same information store 230, or alternatively, may be stored in separate information stores 230. If a client computer 220 has two or more types of data, one data agent 240 may be implemented for each data type to archive, migrate, and restore the client computer 220 data.

A database archiving module ("DB archiving module") 250 can form a part of a respective data agent 250, and generally manages archiving of data associated with a specific database application 260. The database archiving module 250 may include logic that incorporates and/or is based on information relating to a specific database application 260 with which it is associated. Such information may include database schema, table structure, relationships between tables, database specific ("native") commands, etc. For example, if a data storage system 200 utilizes Oracle and IBM databases, the system 200 may provide a database archiving module 250 associated with Oracle and another database archiving module 250 associated with DB2. The database archiving module 250 for Oracle manages the archiving of data associated with the Oracle DBMS, and the database archiving module 250 for IBM manages the archiving of data associated with the IBM DBMS. In some embodiments, instead of forming a part of the data agent 240, the database archiving module 250 is a software module that forms a part of or resides on the storage manager 210 or, alternatively, the media agents 270. The database archiving module 250 can additionally be a separate software module executing on one or more of the client computers 220. The database archiving module 250 will be discussed in more detail with respect to FIGS. 3-5.

Storage managers 210 may be the same or similar to the storage managers 140 described with respect to FIGS. 1C-1E, and generally can be a software module or application that coordinates and controls the system. The storage manager 210 communicates with all elements of the storage system 200 including the client computers 220, data agents 240, the media agents 270, and the storage devices 280, to initiate and manage system backups, migrations, recoveries, and the like. The storage manager 210 can be located within the client 220, the media agent 270, or can be a software module within a separate computing device. In other words, the media agent 270 and/or the client 220 can include a storage manager module. In one embodiment, the storage manager 210 is located in close proximity to the client 220 and communicates with the client 220 via a LAN. In another embodiment, the storage manager 210 communicates with the client 220 via a WAN. Similarly, in one embodiment, the storage manager 210 communicates with the media agent 270 via a LAN, and in another embodiment communicates with the media agent 270 via a WAN.

The storage manager 210 can also deduplicate the data that is being backed up in storage device 280. For example, the storage manager 210 can analyze individual data blocks being backed up, and replace duplicate data blocks with pointers to other data blocks already stored in the storage device 280. To identify duplicate data blocks, the storage manager 210 can perform hash functions, on each data block. The hash functions of the different data blocks can be compared. Matching hashes of different data blocks can indicate duplicate data, which can be replaced with a pointer to previously stored data. Additional detail regarding deduplicating data is provided in the applications incorporated by reference herein. Other components of storage system 200 can perform the deduplication techniques on the data blocks, such as the media agent 270, the client 220, and/or the storage device 280.

A media agent 270 may be the same or similar to the media agents 144 described with respect to FIGS. 1C-1E. The media agent 270 is generally a software module that conducts data, as directed by the storage manager 210, between locations in the storage system 200. For example, the media agent 270 may conduct data between the client computer 220 and one or more storage devices 280, between two or more storage devices 280, etc. Although not shown in FIG. 2, one or more of the media agents 270 can also be communicatively coupled to one another. In some embodiments, the media agent 270 communicates with the storage manager 210 via a LAN or SAN. In other embodiments, the media agent 270 communicates with the storage manager 210 via a WAN. The media agent 270 generally communicates with the storage devices 280 via a local bus. In some embodiments, the storage device 280 is communicatively coupled to the media agent(s) 270 via a Storage Area Network ("SAN").

The storage devices 280 can include a tape library, a magnetic media storage device, an optical media storage device, or other storage device. The storage devices 280 can further store the data according to a deduplication schema as discussed above. The storage devices 280 can also include a signature block corresponding to each stored data block.

Further embodiments of storage systems such as the one shown in FIG. 2 are described in application Ser. No. 10/818,749, now U.S. Pat. No. 7,246,207, issued Jul. 17, 2007, which is hereby incorporated by reference in its entirety. In various embodiments, components of the storage system may be distributed amongst multiple computers, or one or more of the components may reside and execute on the same computer.

Furthermore, components of the storage system of FIG. 2 can also communicate with each other via a computer network. For example, the network may comprise a public network such as the Internet, virtual private network (VPN), token ring or TCP/IP based network, wide area network (WAN), local area network (LAN), an intranet network, point-to-point link, a wireless network, cellular network, wireless data transmission system, two-way cable system, interactive kiosk network, satellite network, broadband network, baseband network, combinations of the same or the like.

Additionally, the various components of FIG. 2 may be configured for deduplication. For example, one or more of the clients 220 can include a deduplicated database (DDB). The data stored in the storage devices 280 may also be deduplicated. For example, one or more of the media agents 270 associated with the respective storage devices 280 can manage the deduplication of data in the storage devices 280.

An Example Data Storage System for Database Archiving

Figure 3:
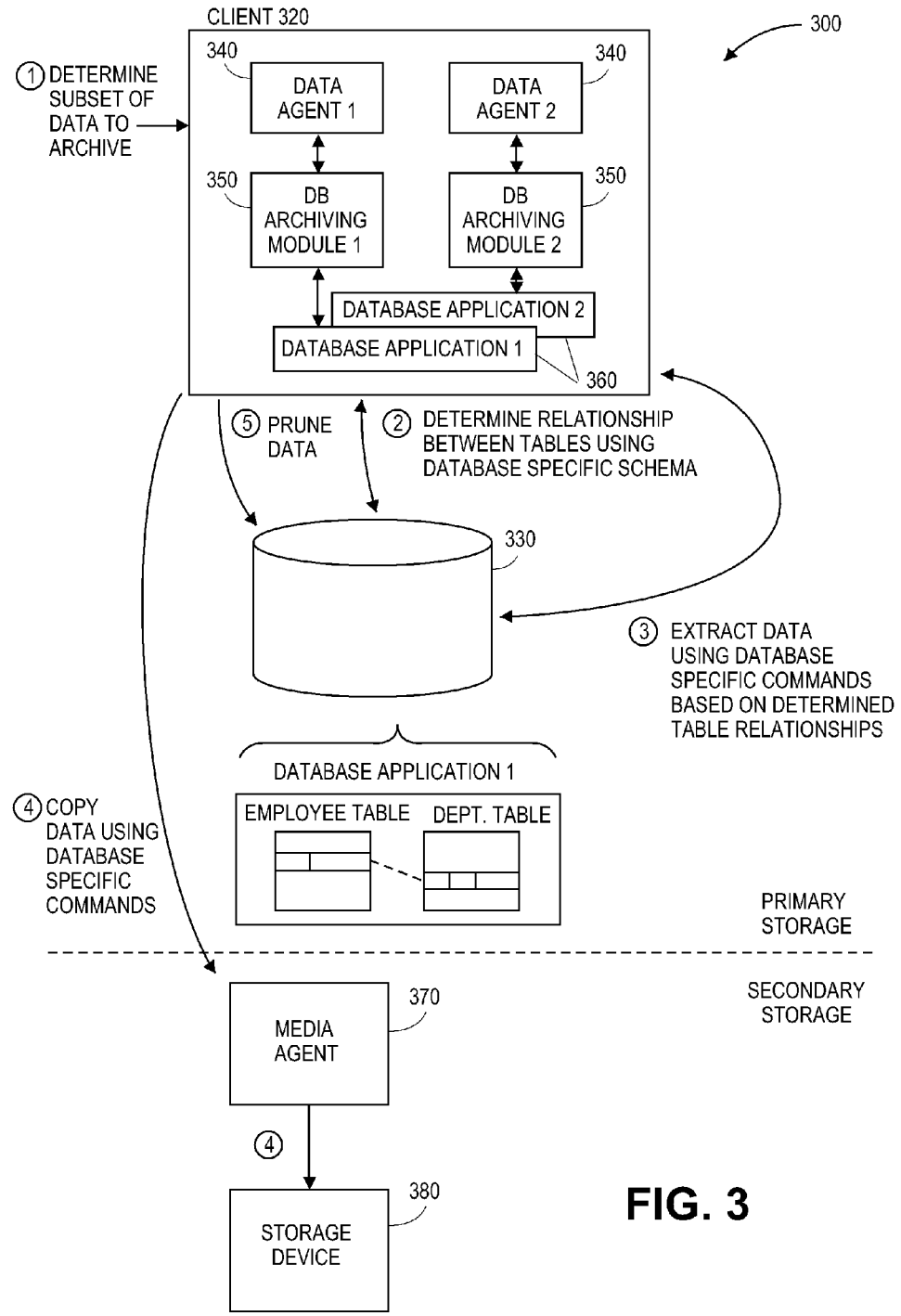
FIG. 3 is a data flow diagram illustrative of the interaction between the various components of an example storage system configured to archive database data according to certain embodiments.

FIG. 3 is a data flow diagram illustrative of the interaction between the various components of an example data storage system 300 configured to archive database data according to certain embodiments. As illustrated, the example storage system 300 includes a client 320, an information store 330 associated with the client 320, one or more data agents 340, one or more database archiving modules 350, one or more applications 360, a media agent 370, and a storage device 380. For instance, the information store(s) 330 may form and/or be referred to as primary storage, and the data stored therein may form primary copies of production data generated by the applications (e.g., the database application(s)) residing on the client(s) 320. Moreover, the storage device(s) 380 may form and/or be referred to as secondary storage, and the data stored thereon may form secondary copies representing versions (e.g., point-in-time versions) of the primary copy data. As shown, the data agents 340, database archiving modules 350 and applications 360 can reside on the client 320. Although not shown, there may be more than one client 320 and, in such cases, there may be a different information store 330 associated with each of the clients 320. Depending on the embodiment, the system 300 of FIG. 3 may additionally include any of the other components shown in FIG. 2 that are not specifically shown in FIG. 3 (e.g., one or more storage managers 210). The system 300 may include one or more of each component. All components of the system 300 can be in direct communication with each other or communicate indirectly via the client 320, the storage manager, the media agent 370, or the like. In certain embodiments, some of the components in FIG. 3 shown as separate components can reside on a single computing device. For example, the database archiving module 350 can be on the client 320 or on a separate computing device.

With further reference to FIG. 3, the interaction between the various components of the example data storage system 300 configured to implement a technique for archiving data generated by the database application(s) 360, as will now be described in greater detail with respect to data flow steps indicated by the numbered arrows.

At data flow step 1, the user selects a subset of data in the information store 330 to archive. For instance, the information store 330 may reside in one or more storage devices associated with the client 320, and may contain data generated by the database application(s) 360. Each client 320 may have its own information store 330 for storing primary storage data, including the information generated by the database application(s), or alternatively, multiple clients 320 may share an information store 330. In some embodiments, data associated with different database applications 360 may be selected for archiving using one common graphical user interface (GUI). For instance, the same user interface (UI) can show the data in an Oracle database, an IBM DB2 database, and a Microsoft SQL Server database. The user can select a subset of data to archive from each database from the same user interface. The data associated with various database applications 360 may be displayed separately, or alternatively, may be presented in a unified, integrated manner. For example, the data associated with database applications 360 may be organized hierarchically by, e.g., client 320, database application 360, database application 360 user, schema, and tables, and the user may be able to select the subset of the data to archive by navigating through the different levels.

Once the user selects specific subset of database data for archiving, the storage manager may receive instructions to archive the data. When the instructions are received, the storage manager may instruct the database archiving module 350 corresponding to the database application 360 associated with the selected data to archive the data to storage devices 380. Each database application 360 may have a dedicated DB archiving module 350 incorporating logic that is based on the underlying native interface (e.g., native schema and/or native commands) of the particular database application 360 and that is responsible for managing the archiving of the data for that database application 360. For instance, the DB archiving module 350 for Oracle manages the archiving of data associated with Oracle databases, and the DB archiving module 350 for SQL Server manages the archiving of data associated with Microsoft SQL Server databases. In some embodiments, the archiving GUI may execute on the client 320, and the instructions to archive the data may be sent from the client 320 to the storage manager or the data agent 340. The GUI may execute on the storage manager in other embodiments.

As explained above, the storage manager may receive the instructions to archive the selected data and determine which database application 360 is associated with the data. The storage manager may instruct the data agent 340 for that database application 360 to initiate archiving. Alternatively, the storage manager may instruct the database archiving module 350 for that database application 360 to initiate archiving.

A database archiving module 350 specific to a database application 360 may include logic that is based on the underlying database specific schema and commands. Because data in a database is very much related, having access to information relating to the database schema can allow the DB archiving module 350 to determine the relationship between the data in the database (e.g., tables and/or other relational database data structures) to determine how to perform the archiving in a fashion that preserves the integrity of the database. For instance, the system prunes data as part of the archiving process only after taking into account relevant dependencies. This technique avoids or substantially reduces the risk that broken dependencies will exist in the primary and/or secondary copies of the database. Employing the native database schema can also help the DB archiving module 350 efficiently navigate through the records in the database. Moreover, using native database specific commands for database operations, such as copying and deleting records in the database, can reduce the amount of time required to archive the database. Pruning the copied data from the source can make more storage space available in the information store 330, and processing the reduced amount of data for the database application 360 can make database operations faster.

At data flow step 2, the database archiving module 350 determines the relationships between the tables of a database using the database specific schema for that database application 360. Each database application 360 may employ a different database schema. For example, the database schema for Oracle databases may differ from the database schema for SQL Server databases.

Database schema may generally refer to the structure of a database system and how the data is organized in the database system. For example, the schema may specify how a database is divided into various tables. The term "schema" may have a more distinct meaning in the context of a particular database system, depending on the type of database application 360. For example, in an Oracle database, the term "schema" may refer to a collection of database objects owned by a particular database user. In a relational database, the schema may define or specify the data structures that form the database, and how they relate to one another, including tables, fields, relationships, views, indexes, packages, procedures, functions, queues, triggers, data types, sequences, materialized views, synonyms, database links, directories, Java schemas, XML schemas, and other elements. The schema of a database may be described in a formal language supported by the database management system.

A database is generally organized into a number of tables. An example table may represent an entity about which data is to be collected (e.g., employees). The example table contains rows and columns of data. A row may correspond to data about one instance of the entity represented by the table (e.g., a particular employee), and columns for a row may correspond to attributes for the entity (e.g., Social Security Number, Employee ID, etc.). The primary key for a table is an identifier that uniquely identifies each row in the table (e.g., Social Security Number or Employee ID). A primary key can be a combination of columns if such combination can uniquely identify a row in the table. Tables are often related to one another. For example, a record in one table may refer to a value in another table (e.g., Department ID may be referred to in the Employee table). A foreign key can be used to cross-reference tables. A foreign key identifies a column (or set of columns) in a table that refers to a column (or set of columns) in another table. The referenced column (or set of columns) may be the primary key of the other table so that a unique row in the other table is identified by the foreign key. In this or other possible manners, the data in a database is related to each other. A relationship may define the association among entities or tables. Relationships may be implemented by constraints, rules that generally restrict allowable data values for a table or a column.

The DB archiving module 350 may determine the relationships between the tables in the database based on the database schema. Determining the relationships between tables will now be explained with reference to a specific example. Corporation A stores data related to its employees in an SQL Server database. The data is organized into Employee table, Department table, and Project table. The Employee table contains the following columns: Employee ID, Name, Social Security Number, Address, Employment Date, and Dept ID. The Employee ID column is the primary key for the Employee table and uniquely identifies each employee. The Social Security Number also uniquely identifies each employee and can be used as the primary key, but Corporation A decides to use Employee ID for convenience. The Department table contains the following columns among others: Department ID, Department Name, Department Chair. The Department ID column is the primary key for the table and uniquely identifies each department. In Corporation A, each employee may belong to one department, and the Dept ID column in the Employee table refers to the Department ID column in the Department table. The Dept ID column is a foreign key to the Department table since it refers to the primary key of the Department table. As the foreign key, the Dept ID column links the records in the Employee table to the Department table and identifies unique records in the Department table. The Project table contains records of projects an employee is managing and includes the following columns: Project ID, Employee ID, Project Name, Project Description, Project Duration, etc. Project ID is the primary key for the Project table. Employee ID is the foreign key for the Project table since it associates the Project table with the Employee table.

The user selects a subset of employee data to archive, e.g., records for employees who were hired before 1990. Such subset can be determined by selecting records with Employment Date before year 1990. Because the data in the database is interrelated, the DB archiving module 350 for SQL Server determines which tables the Employee table is related to, in order to archive the related records along with the selected data in the Employee table. As discussed, the SQL Server DB archiving module 350 incorporates logic representative of or otherwise "understands" or has access to the native schema and/or native commands of the SQL Server database. This allows the SQL archiving module 350 to efficiently process the data in the SQL database to identify the inter-related data. For instance, using the SQL schema information and/or SQL commands, the DB archiving module 350 accesses and processes the data in SQL database and determines that the Department table and the Project table contain records that relate to records in the Employee table.

As one example, suppose Employee E was hired before 1990 and has an Employee ID of "101." Employee E belongs to the sales department, which is identified by Department ID "50." Employee E works on three projects, which are identified by Project ID's "701," "702," and "703," respectively. If the data for Employee E is selected to be archived, the DB archiving module 350 would know from the database schema that data relating to Employee E needs to be obtained from the Employee table, the Department table, and the Project table. As explained above, the Dept ID column associates the Employee table with the Department table, and the Employee ID column associates the Project table with the Employee table. Accordingly, the records that relate to Employee E would include: 1) the record in the Employee table with Employee ID=101; 2) the record in the Department table with Department ID that is the same as Dept ID for Employee ID=101; and 3) the records in the Project table with Employee ID=101. The Employee table will contain only one record for Employee E, i.e., the record with Employee ID=101, since Employee ID uniquely identifies each employee's record as the primary key. The Department table will contain one record associated with Employee E, i.e., the record with Department ID=50. The Project table contains three records for Employee E, i.e., the record with Project ID=701 and Employee ID=101; the record with Project ID=702 and Employee ID=101; and the record with Project ID=703 and Employee ID=101.

As the DB archiving module 350 determines the relationships between the tables, the DB archiving module 350 may construct rules to extract and archive the selected data. For example, the rules may specify that data to be archived includes records in the Employee table with Employment Date less than 1990 and records in the Department table and in the Project table associated with the corresponding Employee ID's. The rules may also specify how to extract, copy, and prune the selected data based on archiving rules specified by each user. For example, one user may prefer not to prune the data in certain tables after copying the data to secondary storage, whereas another user may prefer to always prune the data after copying. Although archiving generally involves deleting the data from the source after it has been copied, a user may choose not to delete some or all or the data that is being archived. Accordingly, rules may specify for each table whether to copy, prune, etc. with respect to records in that table. Such rules can be maintained in one or more XML files and may be stored by the storage manager. The rules for various users may be sent from the storage manager to the data agents 340, and the DB archiving module 350 may construct the rules by combining the archiving rules for various users.

At data flow step 3, the database archiving module 350 extracts data to be archived using database specific commands based on the determined table relationships. In this step, the DB archiving module 350 retrieves all the records to be archived from the relevant tables so that they can be copied to the storage devices 380. In the Corporation A example in data flow step 2, the DB archiving module 350 retrieves all the records relating to employees who were hired prior to 1990 from the Employee table, the Department table, and the Project table. The data extracted by the DB archiving module 350 includes the records relating to Employee E from each of the three tables (as identified in the example above). As explained with respect to data flow step 2, the DB archiving module 350 may construct rules for extracting the records to archive when it determines the table relationships based on the database schema, and the extraction of the data to be archived may be performed based on these rules. The DB archiving module 350 may extract the records using database specific commands. In the Corporation A example, these commands would be SQL Server specific commands. Because many records may be involved in the archiving process (e.g., thousands or millions of records), retrieving the data to be archived may take a long time, and the DB archiving module 350 using the SQL Server database commands to traverse the tables as well as to select the records improves efficiency.

At data flow step 4, the extracted data to be archived is copied from the information store 330 to the storage devices 380. The database archiving module 350 may copy the extracted data using database specific commands, e.g., to increase the speed of copying. The extracted data can be copied to an appropriate type of storage device 380 according to the requirements of the organization. For example, the extracted data may be copied to a tape library, a disc library, another database, etc. The data may be stored in the storage devices 380 in various formats. For instance, the data may be stored as a file. The file may be in a proprietary format associated with a database application 360. The extracted data may also be stored in tables in another database. As shown in FIG. 3, a media agent 370 may copy or manage the copying of the data from the information store 330 to the appropriate storage device 380.

In some embodiments, the data that has been extracted may be accumulated prior to being copied to the storage devices 380. For example, the extracted data may be written to and aggregated in a separate area on the client 320 machine or in the information store 330. This separate area may be referred to as the "staging area." For instance, the database archiving module 350 may write all or part of the extracted data to the staging area so that the data to be archived is not copied over to the media agent 370 and/or the storage devices 380 in a piecemeal manner. Instead, data can be copied using a less number of storage operations, making the archiving process faster and more efficient. For example, if the client 320 has 100 GB of space on the client machine, 5 GB may be set aside as the staging area, and the DB archiving module 350 can write the extracted data to the staging area so that all or a large portion of the extracted data can be copied in one storage operation (to the media agent 370 and/or the storage devices 380).

At data flow step 5, the copied data is pruned from the information store 330. The steps 4 and 5 together may constitute archiving, e.g., the data that is copied to the destination storage devices is deleted from the source. The database archiving module 350 may use database specific commands when pruning the data that has been extracted and copied. In pruning the copied data from the source, the order of deletion can be very important since records that are referenced by or link to other tables should not be deleted first. Accordingly, the DB archiving module 350 may rely on the database schema when pruning the copied data to delete records based on the identified dependencies, in a "dependency-aware" fashion. In the Corporation A example, when deleting the records relating to Employee E after they have been copied to the storage devices 380, the records in the Project table are deleted first, then the record in the Employee table, then the record in the Department table. For example, if the record in the Employee table were deleted before the Project table records, the cross-references to the Employee table will become invalid since the referenced record in the Employee table no longer exists. After the record in the Employee table is pruned, the corresponding record in the Department table may also be pruned. For example, if the Department no longer exists, the record for that department does not need to be in the Department table and may be deleted. However, if other records in the Employee table still reference a particular department record in the Department table, that record may not be deleted. In such case, the archiving rules may specify that records should not be pruned from the Department table. The DB archiving module 350 can determine the order of deletion of the copied records based on the database schema to avoid deleting any referenced records before deleting the referencing records. The DB archiving module 350 may utilize the table relationships that were determined in data flow step 2. After the selected data is archived to the secondary storage devices 380, all or part of the archived data may be restored. The user may restore the archived data using the same user interface as the one for archiving.

Figure 4:
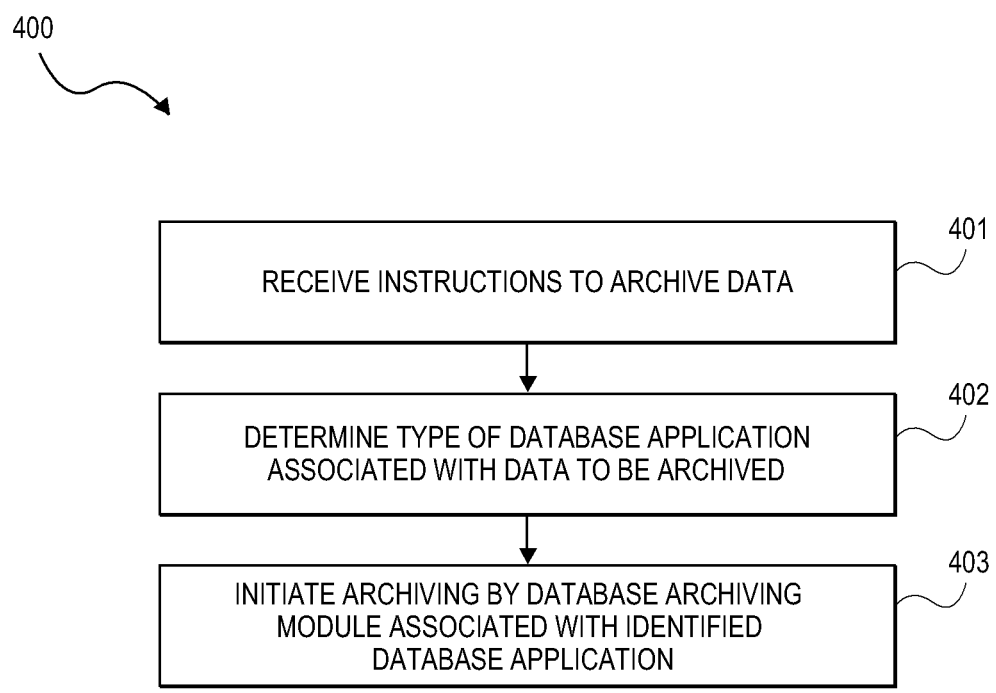
FIG. 4 is a flow diagram illustrative of one embodiment of a routine for archiving database data.

FIG. 4 is a flow diagram illustrative of one embodiment of a routine 400 for archiving database data. The routine 400 is described with respect to the system 300 of FIG. 3. However, one or more of the steps of routine 400 may be implemented by other data storage systems, such as those described in greater detail above with reference to FIG. 2. The routine 400 can be implemented by any one, or a combination of, a client, a storage manager, a data agent, a database archiving module, a media agent, and the like. Moreover, further details regarding certain aspects of at least some of steps of the routine 400 are described in greater detail above with reference to FIG. 3. Although described in relation to archiving operations for the purposes of illustration, the process of FIG. 4 can be compatible with other types of storage operations, such as, for example, backup, migration, snapshots, replication operations, and the like.

At block 401, the storage manager may receive the information regarding data to archive. The user may select a subset of data associated with one or more database applications 360 for archiving. The data for different database applications 360 may be selected using one UI.

At block 402, the storage manager determines the type of database application 360 associated with the data to be archived. For instance, the data selected for archiving may include data associated with Oracle, data associated with DB2, data associated with SQL Server, etc. The storage manager can determine which DB archiving module 350 should be used to archive the data based on the type of database application 360. The storage manager may directly instruct the DB archiving module 350 to initiate archiving, or alternatively, may instruct the data agent 340 for the corresponding database application 360, and the data agent 340 may in turn instruct the appropriate DB archiving module 350. Depending on the data that was selected to be archived, the storage manager may send instructions to one or multiple data agents 340 or DB archiving modules 350. For instance, the data to be archived may include data associated with multiple database applications 360.

At block 403, the storage manager or the data agent 340 initiates archiving by the database archiving module 350 associated with the identified database application 360.

Once the storage manager or the data agent 340 determines which DB archiving module(s) 350 should be used, the storage manager or the data agent 340 may send instructions to the appropriate DB archiving module 350 to initiate archiving.

The routine 400 can include fewer, more, or different blocks than those illustrated in FIG. 4 without departing from the spirit and scope of the description. Moreover, it will be appreciated by those skilled in the art and others that some or all of the functions described in this disclosure may be embodied in software executed by one or more processors of the disclosed components and mobile communication devices. The software may be persistently stored in any type of non-volatile storage.

Figure 5:
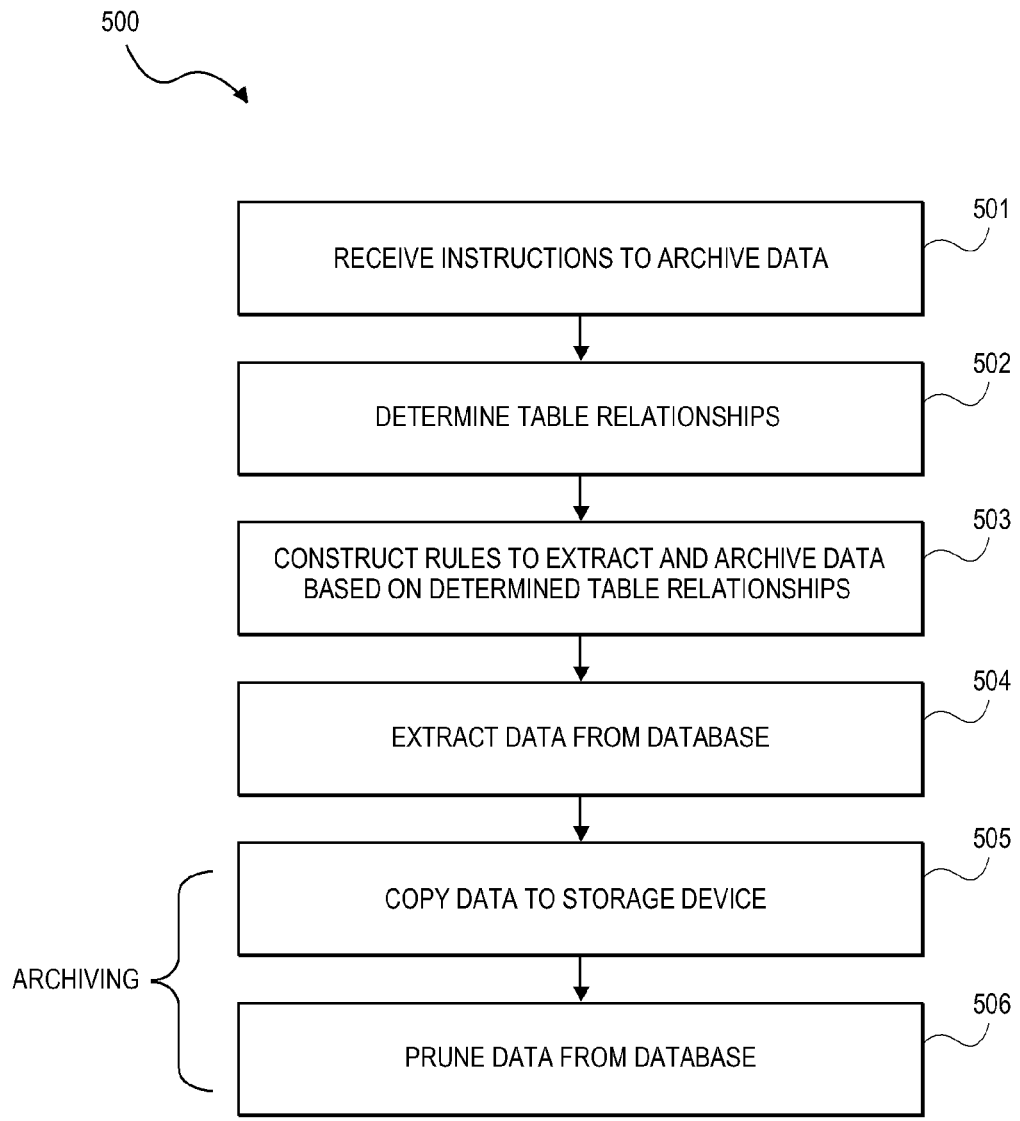
FIG. 5 is a flow diagram illustrative of one embodiment of a routine for archiving database data.

FIG. 5 is a flow diagram illustrative of one embodiment of a routine 500 for archiving database data. The routine 500 is described with respect to the system 300 of FIG. 3. However, one or more of the steps of routine 500 may be implemented by other data storage systems, such as those described in greater detail above with reference to FIG. 2. The routine 500 can be implemented by any one, or a combination of, a client, a storage manager, a data agent, a database archiving module, a media agent, and the like. Moreover, further details regarding certain aspects of at least some of steps of the routine 500 are described in greater detail above with reference to FIG. 3. Although described in relation to archiving operations for the purposes of illustration, the process of FIG. 5 can be compatible with other types of storage operations, such as, for example, backup, migration, snapshots, replication operations, and the like.

At block 501, the database archiving module 350 receives instructions to archive data. As explained above, the instructions may be sent by the storage manager or by the data agent 340 associated with the DB archiving module 350. Each DB archiving module 350 can be specific to a database application 360.

At block 502, the DB archiving module 350 determines the table relationships for the database application 360 it is associated with. Each DB archiving module 350 can include logic that incorporates and/or is based on the database schema of a specific database application 360. For instance, if the database application 360 is Oracle DBMS, the DB archiving module 350 specific to Oracle can determine the table relationships based on the Oracle DBMS schema.

At block 503, the DB archiving module 350 constructs rules to extract and archive data based on the table relationships determined at block 502. After the DB archiving module 350 determines which tables are related, the DB archiving module 350 can construct rules that extract the actual records to be archived. The same rules also may define how the records will be copied to the storage devices 380 and pruned.

At block 504, the DB archiving module 350 extracts the data to be archived from the information store 330. The DB archiving module 350 may use database specific commands in order to extract the data. The extraction of the data may be performed using the rules constructed at block 503.

At block 505, the DB archiving module 350 copies the extracted to the designated storage device(s) 380. Various types of storage devices 380 may be used, such as tape library, disc library, external databases, etc. As explained with respect to FIG. 3, the extracted data may be written to and aggregated in a staging area prior to copying, and then, the extracted data can be copied from the staging area to the storage devices 380 in large portions, using a fewer number of storage operations. The copying of the data may be performed based on the rules constructed at block 503.

At block 506, the DB archiving module 350 prunes the data that has been copied to the storage devices 380 from the information store 330. The steps in blocks 505 and 506 together may be referred to as "archiving." Pruning may be based on the database schema and the table relationships for the associated database application 360, for example, as determined at block 502. The order of deletion of records may be determined based on the database schema and table relationships. For instance, the referenced records in a table should be deleted after any referencing record in other tables. The pruning of the data may be performed based on the rules constructed at block 503.

The routine 500 can include fewer, more, or different blocks than those illustrated in FIG. 5 without departing from the spirit and scope of the description. Moreover, it will be appreciated by those skilled in the art and others that some or all of the functions described in this disclosure may be embodied in software executed by one or more processors of the disclosed components and mobile communication devices. The software may be persistently stored in any type of non-volatile storage.

In some embodiments, application data over its lifetime moves from more expensive quick access storage to less expensive slower access storage. This process of moving data through these various tiers of storage is sometimes referred to as information lifecycle management ("ILM"). This is the process by which data is "aged" from forms of primary storage with faster access/restore times down through less expensive secondary storage with slower access/restore times. For example, such aging may occur as data becomes less important or mission critical over time.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the described methods and systems may be made without departing from the spirit of the disclosure. The accompanying claims and their equivalents are intended to cover such forms or modifications as would fall within the scope and spirit of the disclosure.

What is claimed is:

1. A method of archiving database data of a first database application in a networked data storage system, the method comprising:
   with a first data agent separate from the first database application and executing on a first computing device comprising computer hardware:
      receiving instructions to archive a first subset of data in the first database, the first database organized as a plurality of tables and stored in one or more first storage devices residing in a primary storage subsystem together with the first computing device, the first subset of data contained in one or more first tables of the plurality of tables, the first database generated by a first database application residing on the first computing device, wherein the primary storage subsystem stores an aggregated group of data of the first database designated for archiving prior to said receiving instructions to archive the first subset of data, the aggregated group of data being separate from the first database;
      identifying a second subset of data in the first database, the second subset referenced by the first subset and contained in one or more second tables of the plurality of tables;
      obtaining the first and second subsets of data from the first database;
      adding the first and second subsets to the aggregated group of data of the first database, the aggregated group of data including data accumulated from a plurality of prior archiving requests such that archived data can be copied from the primary storage subsystem to a secondary storage subsystem more efficiently and with less storage operations than in a piecemeal manner;
      deleting at least the first and second subsets of data from the first database; and
      subsequent to said adding, determining that the aggregated group of data designated for archiving, including the first and second subsets, should be copied to one or more secondary storage devices in the secondary storage subsystem; and
   with a secondary storage controller computer, copying the aggregated group of data from the primary storage subsystem to the one or more secondary storage devices, and
   wherein the first subset includes at least a first data item and the second subset includes at least one data item referenced by the first data item.

2. The method of claim 1, wherein said identifying comprises using a native schema of the first database application to identify the second subset of data as being referenced by the first subset of data.

3. The method of claim 2, wherein said obtaining comprises using native commands of the first database application to obtain the first and second subsets of data.

4. The method of claim 3, wherein said deleting comprises using native commands of the first database application to delete at least the first and second subsets of data.

5. The method of claim 1, wherein the aggregated group of data resides in a temporary staging area.

6. The method of claim 5, wherein the temporary staging area resides on the one or more first storage devices.

7. The method of claim 1, wherein the secondary storage subsystem is in networked communication with the primary storage system.

8. A data storage system configured to archive data generated by one or more database applications, the data storage system comprising:
   one or more first storage devices residing in a primary storage subsystem;
   one or more secondary storage devices residing in a secondary storage subsystem;
   one or more secondary storage controller computers; and
   a plurality of client computing devices residing in the primary storage subsystem and including a first client computing device that is associated with the one or more first storage devices and comprises a first database application and a first data agent residing thereon, the first data agent being separate from the first database application and configured to:
- receive instructions to archive a first subset of data in a first database, the first database organized as a plurality of tables and stored in the one or more first storage devices residing in the primary storage subsystem, the first subset of data contained in one or more first tables of the plurality of tables, the first database generated by the first database application, wherein the primary storage subsystem stores an aggregated group of data of the first database designated for archiving prior to said receiving instructions to archive the first subset of data, the aggregated group of data being separate from the first database;
- identify a second subset of data in the first database, the second subset referenced by the first subset and contained in one or more second tables of the plurality of tables;
- obtain the first and second subsets of data from the first database;
- add the first and second subsets to the aggregated group of data of the first database, the aggregated group of data including data accumulated from a plurality of prior archiving requests such that archived data can be copied from the primary storage subsystem to the secondary storage subsystem more efficiently and with less storage operations than in a piecemeal manner;
- delete at least the first and second subsets of data from the first database and
- subsequent to the addition of the first and second subsets to the aggregated group of data designated for archiving, determine that the aggregated group of data designated for archiving, including the first and second subsets, should be copied to the one or more secondary storage devices in the secondary storage subsystem, the one or more secondary storage controller computers configured to copy the aggregated group of data from the primary storage subsystem to the one or more secondary storage devices, and wherein the first subset includes at least a first data item and the second subset includes at least one data item referenced by the first data item.

9. The system of claim 8, wherein the first data agent is configured to identify the second subset of data using a native schema of the first database application.

10. The system of claim 8, wherein the first data agent is configured to obtain the first and second subsets by interacting with the first database application using native commands of the first database application.

11. The system of claim 8, wherein the first data agent is configured to delete at least the first and second subsets by interacting with the first database application using native commands of the first database application.

12. The system of claim 8, wherein the aggregated group of data resides in a temporary staging area.

13. The system of claim 12, wherein the temporary staging area resides on the one or more first storage devices.

14. A non-transitory computer readable medium comprising instructions for archiving data generated by one or more database applications in a networked data storage system, where the instructions when executed by a computing system comprising one or more computing devices, cause the computing system to perform a method comprising:
- receiving instructions to archive a first subset of data in a first database, the first database organized as a plurality of tables and stored in one or more first storage devices residing in a primary storage subsystem together with the first computing device, the first subset of data contained in one or more first tables of the plurality of tables, the first database generated by a first database application residing on the first computing device, wherein the primary storage subsystem stores an aggregated group of data of the first database designated for archiving prior to said receiving instructions to archive the first subset of data, the aggregated group of data being separate from the first database;
- identifying a second subset of data in the first database, the second subset referenced by the first subset and contained in one or more second tables of the plurality of tables;
- obtaining the first and second subsets of data from the first database;
- adding the first and second subsets to the aggregated group of data, the aggregated group of data including data accumulated from a plurality of prior archiving requests, such that archived data can be copied from the primary storage subsystem to a secondary storage subsystem more efficiently and with less storage operations than in a piecemeal manner;
- deleting at least the first and second subsets of data from the first database
- subsequent to said adding, determining that the aggregated group of data designated for archiving, including the first and second subsets, should be copied to the one or more secondary storage devices in the secondary storage subsystem; and
- copying the aggregated group of data from the primary storage subsystem to the one or more secondary storage devices, and
- wherein the first subset includes at least a first data item and the second subset includes at least one data item referenced by the first data item.

15. The non-transitory computer readable medium of claim 14, wherein said identifying comprises using a native schema of the first database application to identify the second subset of data as being referenced by the first subset of data.

16. The non-transitory computer readable medium of claim 15, wherein said obtaining comprises using native commands of the first database application to obtain the first and second subsets of data.

17. The non-transitory computer readable medium of claim 14, wherein said deleting comprises using native commands of the first database application to delete at least the first and second subsets of data.

18. The non-transitory computer readable medium of claim 14, wherein the aggregated group of data resides in a temporary staging area.

19. The non-transitory computer readable medium of claim 18, wherein the temporary staging area resides on the one or more first storage devices.

20. The method of claim 15, wherein the secondary storage subsystem is in networked communication with the primary storage system.

* * * * *